United States Patent
Gottlieb

(10) Patent No.: US 10,271,010 B2
(45) Date of Patent: Apr. 23, 2019

(54) SYSTEMS AND METHODS FOR CONTROLLING THE DISPLAY OF CONTENT

(71) Applicant: SHINDIG, INC., New York, NY (US)

(72) Inventor: Steven M. Gottlieb, New York, NY (US)

(73) Assignee: Shindig, Inc., New York, NY (US)

( * ) Notice: Subject to any disclaimer, the term of this patent is extended or adjusted under 35 U.S.C. 154(b) by 497 days.

(21) Appl. No.: 14/068,441

(22) Filed: Oct. 31, 2013

(65) Prior Publication Data
US 2015/0116448 A1     Apr. 30, 2015

(51) Int. Cl.
| G06F 3/00 | (2006.01) |
|---|---|
| H04N 7/14 | (2006.01) |
| G06F 3/0484 | (2013.01) |
| H04N 21/472 | (2011.01) |
| H04N 21/485 | (2011.01) |
| H04N 21/44 | (2011.01) |
| G06F 3/0481 | (2013.01) |
| G06F 3/01 | (2006.01) |

(52) U.S. Cl.
CPC ......... *H04N 7/141* (2013.01); *G06F 3/04815* (2013.01); *G06F 3/04845* (2013.01); *H04N 21/44008* (2013.01); *H04N 21/47205* (2013.01); *H04N 21/4858* (2013.01); *G06F 2203/04806* (2013.01); *H04N 2007/145* (2013.01)

(58) Field of Classification Search
CPC .. H04N 7/148; H04N 21/4438; G06T 19/006; G06F 3/011; G06F 3/0484

USPC ......................................................... 715/719
See application file for complete search history.

(56) References Cited

U.S. PATENT DOCUMENTS

| 5,040,231 A | 8/1991 | Terzian |
|---|---|---|
| 5,612,716 A | 3/1997 | Chida et al. |
| 5,847,709 A | 12/1998 | Card |
| 6,044,146 A | 3/2000 | Gisby et al. |
| 6,241,612 B1 | 6/2001 | Heredia |
| 6,259,471 B1 | 7/2001 | Peters et al. |
| 6,419,137 B1 | 7/2002 | Marshall et al. |
| 6,515,681 B1 | 2/2003 | Knight |
| 6,559,863 B1 | 5/2003 | Megiddo |

(Continued)

FOREIGN PATENT DOCUMENTS

| CA | 2771785 | 3/2011 |
|---|---|---|
| CA | 2774014 | 4/2011 |

(Continued)

OTHER PUBLICATIONS

U.S. Appl. No. 12/624,829, filed Nov. 24, 2009, U.S. Pat. No. 8,405,702, Mar. 26, 2013.

(Continued)

*Primary Examiner* — Nicholas Augustine
(74) *Attorney, Agent, or Firm* — Robert W. Morris; Ojeiku C. Aisiku; Eckert Seamans Cherin & Mellott, LLC

(57) ABSTRACT

Systems and methods for controlling the display of content are provided. In at least one embodiment, a method for controlling the display of live video feeds in a video chat is provided. The method includes displaying the video feed in a first manner, altering the display of the video feed when a predefined time elapses, and maintaining the altered display of the video feed until at least one predetermined event occurs.

11 Claims, 13 Drawing Sheets

(56) References Cited

U.S. PATENT DOCUMENTS

| | | |
|---|---|---|
| 6,654,346 B1 | 11/2003 | Mahalingaiah et al. |
| 6,697,614 B2 | 2/2004 | Dorenbosch |
| 7,007,235 B1 | 2/2006 | Hussein |
| 7,236,529 B2 * | 6/2007 | Lin .................... H04N 19/176 375/240.2 |
| 7,386,799 B1 | 6/2008 | Clanton |
| 7,478,129 B1 | 1/2009 | Chemtob |
| 7,487,211 B2 | 2/2009 | Beavers et al. |
| 7,495,687 B2 | 2/2009 | DuMas et al. |
| 7,515,560 B2 | 4/2009 | DuMas et al. |
| 7,577,636 B2 * | 8/2009 | Fernandez ........ G06F 17/30017 |
| 7,593,032 B2 | 9/2009 | Civanlar et al. |
| 7,599,963 B2 * | 10/2009 | Fernandez ........ G06F 17/30017 |
| 7,787,447 B1 | 8/2010 | Egan et al. |
| 7,958,457 B1 | 6/2011 | Brandenberg et al. |
| 8,037,139 B1 | 10/2011 | Fish |
| 8,060,560 B2 | 11/2011 | Vonog et al. |
| 8,144,187 B2 | 3/2012 | Moore et al. |
| 8,147,251 B1 | 4/2012 | Anson |
| 8,171,154 B2 | 5/2012 | Vonog et al. |
| 8,225,127 B2 | 7/2012 | Vonog et al. |
| 8,230,355 B1 | 7/2012 | Bauermeister |
| 8,390,670 B1 | 3/2013 | Gottlieb |
| 8,405,702 B1 | 3/2013 | Gottlieb |
| 8,429,704 B2 | 4/2013 | Vonog et al. |
| 8,458,328 B2 | 6/2013 | Dubovik et al. |
| 8,463,677 B2 | 9/2013 | Vonog et al. |
| 8,527,654 B2 | 9/2013 | Vonog et al. |
| 8,549,167 B2 | 10/2013 | Vonog et al. |
| 8,558,868 B2 | 10/2013 | Prentice |
| 8,635,293 B2 | 1/2014 | Fisher |
| 8,647,206 B1 * | 2/2014 | Gottlieb .................. A63F 13/12 463/40 |
| 8,749,610 B1 | 6/2014 | Gossweller |
| 8,779,265 B1 | 7/2014 | Gottlieb |
| 8,856,656 B2 * | 10/2014 | Chao ...................... H04N 1/387 715/716 |
| 8,902,272 B1 | 12/2014 | Gottlieb |
| 8,917,310 B2 | 12/2014 | Gottlieb |
| 8,929,516 B2 | 1/2015 | Odinak |
| 9,041,768 B1 * | 5/2015 | Gottlieb .................. H04N 7/15 348/14.08 |
| 9,215,412 B2 | 12/2015 | Gottlieb |
| 9,241,131 B2 * | 1/2016 | Desai ...................... H04N 7/141 |
| 2002/0094831 A1 | 7/2002 | Maggenti et al. |
| 2002/0102999 A1 | 8/2002 | Maggenti et al. |
| 2002/0143877 A1 | 10/2002 | Hackbarth |
| 2002/0165921 A1 | 11/2002 | Sapieyevski |
| 2002/0169014 A1 | 11/2002 | Egozy et al. |
| 2003/0000369 A1 | 1/2003 | Funaki |
| 2003/0014262 A1 | 1/2003 | Kim |
| 2003/0097385 A1 | 5/2003 | Lee et al. |
| 2003/0164084 A1 | 9/2003 | Redmann et al. |
| 2004/0022202 A1 | 2/2004 | Yang |
| 2004/0201668 A1 | 10/2004 | Matsubara et al. |
| 2004/0255253 A1 | 12/2004 | Marcjan |
| 2004/0260669 A1 * | 12/2004 | Fernandez ........ G06F 17/30017 |
| 2005/0032539 A1 | 2/2005 | Noel et al. |
| 2005/0034075 A1 | 2/2005 | Belhumeur et al. |
| 2005/0078613 A1 | 4/2005 | Covell et al. |
| 2005/0132288 A1 | 6/2005 | Kim et al. |
| 2005/0143135 A1 | 6/2005 | Brems et al. |
| 2005/0210416 A1 | 9/2005 | MacLaurin et al. |
| 2005/0254440 A1 * | 11/2005 | Sorrell ............... H04L 29/06027 370/264 |
| 2005/0262542 A1 | 11/2005 | DeWeese et al. |
| 2006/0002315 A1 | 1/2006 | Theurer |
| 2006/0031776 A1 | 2/2006 | Glein et al. |
| 2006/0055771 A1 | 3/2006 | Kies |
| 2006/0063555 A1 | 3/2006 | Robbins |
| 2006/0087987 A1 * | 4/2006 | Witt .................. G06F 17/30017 370/260 |
| 2006/0112814 A1 | 6/2006 | Paepcke |
| 2006/0114314 A1 | 6/2006 | Dunko |
| 2006/0140138 A1 | 6/2006 | Hill |
| 2006/0168637 A1 * | 7/2006 | Vysotsky ............. H04L 12/1813 725/116 |
| 2007/0039449 A1 | 2/2007 | Redmann |
| 2007/0140510 A1 | 6/2007 | Redmann |
| 2007/0078931 A1 | 7/2007 | Ludwig et al. |
| 2007/0186171 A1 | 8/2007 | Junuzovic |
| 2007/0201809 A1 | 8/2007 | Karaoguz |
| 2007/0229652 A1 | 10/2007 | Center et al. |
| 2007/0234220 A1 | 10/2007 | Khan |
| 2007/0236762 A1 * | 10/2007 | Tsuji .................. G06K 9/00228 358/537 |
| 2007/0255816 A1 | 11/2007 | Quackenbush et al. |
| 2007/0265074 A1 | 11/2007 | Akahori et al. |
| 2008/0002668 A1 | 1/2008 | Asokan et al. |
| 2008/0037763 A1 | 2/2008 | Shaffer et al. |
| 2008/0120560 A1 | 5/2008 | Cohen et al. |
| 2008/0136895 A1 | 6/2008 | Mareachen |
| 2008/0136898 A1 | 6/2008 | Eisenberg et al. |
| 2008/0137559 A1 | 6/2008 | Sasaki et al. |
| 2008/0146339 A1 | 6/2008 | Olsen et al. |
| 2008/0163287 A1 * | 7/2008 | Fernandez ........ G06F 17/30017 725/31 |
| 2008/0181260 A1 | 7/2008 | Vonog et al. |
| 2008/0190271 A1 | 8/2008 | Taub et al. |
| 2008/0232248 A1 | 9/2008 | Barave et al. |
| 2008/0246852 A1 * | 10/2008 | Mori .................. G06K 9/00228 348/222.1 |
| 2008/0274810 A1 | 11/2008 | Hayashi et al. |
| 2008/0316295 A1 | 12/2008 | King et al. |
| 2009/0024963 A1 | 1/2009 | Lindley et al. |
| 2009/0033737 A1 | 2/2009 | Goose et al. |
| 2009/0036108 A1 | 2/2009 | Cho |
| 2009/0037826 A1 | 2/2009 | Bennetts |
| 2009/0040289 A1 | 2/2009 | Hetherington et al. |
| 2009/0043422 A1 * | 2/2009 | Lee .................... G06K 9/00228 700/245 |
| 2009/0054107 A1 | 2/2009 | Feland, III et al. |
| 2009/0058984 A1 | 3/2009 | Lee |
| 2009/0070420 A1 | 3/2009 | Quackenbush |
| 2009/0138805 A1 * | 5/2009 | Hildreth ............. G06K 9/00335 715/745 |
| 2009/0172200 A1 | 7/2009 | Morrison et al. |
| 2009/0186605 A1 | 7/2009 | Apfel et al. |
| 2009/0204906 A1 | 8/2009 | Irving |
| 2009/0209339 A1 | 8/2009 | Okada |
| 2009/0210789 A1 | 8/2009 | Thakkar |
| 2009/0249244 A1 | 10/2009 | Robinson et al. |
| 2009/0254843 A1 | 10/2009 | Van Wie |
| 2009/0257730 A1 | 10/2009 | Chen et al. |
| 2009/0288007 A1 | 11/2009 | Leacock |
| 2009/0327441 A1 * | 12/2009 | Lee ........................ H04L 51/043 709/206 |
| 2010/0005411 A1 | 1/2010 | Duncker |
| 2010/0010890 A1 | 1/2010 | Ditkovski et al. |
| 2010/0026780 A1 | 2/2010 | Tico et al. |
| 2010/0026802 A1 | 2/2010 | Titus et al. |
| 2010/0030578 A1 | 2/2010 | Siddique et al. |
| 2010/0122184 A1 | 5/2010 | Vonog et al. |
| 2010/0130868 A1 | 5/2010 | Chawla |
| 2010/0146085 A1 * | 6/2010 | Van Wie ................ H04L 12/00 709/220 |
| 2010/0165904 A1 | 7/2010 | Woodward et al. |
| 2010/0198992 A1 | 8/2010 | Morrison et al. |
| 2010/0211872 A1 | 8/2010 | Rolston et al. |
| 2010/0258474 A1 | 10/2010 | Vonog et al. |
| 2010/0281375 A1 | 11/2010 | Pendergast et al. |
| 2010/0316232 A1 | 12/2010 | Acero et al. |
| 2011/0010146 A1 | 1/2011 | Buskies et al. |
| 2011/0011244 A1 | 1/2011 | Homburg |
| 2011/0055317 A1 | 3/2011 | Vonog et al. |
| 2011/0060992 A1 | 3/2011 | Jevons |
| 2011/0072366 A1 * | 3/2011 | Spencer .................. G06Q 40/04 715/757 |
| 2011/0078532 A1 | 3/2011 | Vonog et al. |
| 2011/0164141 A1 | 7/2011 | Tico et al. |
| 2011/0179180 A1 | 7/2011 | Schleifer et al. |

(56) References Cited

U.S. PATENT DOCUMENTS

| | | | |
|---|---|---|---|
| 2011/0181685 A1* | 7/2011 | Saleh | H04N 7/142 348/14.08 |
| 2011/0185286 A1 | 7/2011 | Moyers | |
| 2011/0201414 A1 | 8/2011 | Barclay et al. | |
| 2011/0209104 A1 | 8/2011 | Hinckley et al. | |
| 2011/0249073 A1* | 10/2011 | Cranfill | H04N 7/147 348/14.02 |
| 2011/0267422 A1* | 11/2011 | Garcia | H04N 7/15 348/14.16 |
| 2011/0270922 A1 | 11/2011 | Jones | |
| 2011/0279634 A1 | 11/2011 | Periyannan | |
| 2012/0038550 A1 | 2/2012 | Lemmey et al. | |
| 2012/0039382 A1 | 2/2012 | Vonog et al. | |
| 2012/0041859 A1 | 2/2012 | Vonog et al. | |
| 2012/0060101 A1 | 3/2012 | Vonog et al. | |
| 2012/0084456 A1 | 4/2012 | Vonog et al. | |
| 2012/0084672 A1 | 4/2012 | Vonog et al. | |
| 2012/0084682 A1 | 4/2012 | Sirpal | |
| 2012/0098919 A1* | 4/2012 | Tang | H04N 7/148 348/14.03 |
| 2012/0110162 A1 | 5/2012 | Dubovik et al. | |
| 2012/0110163 A1 | 5/2012 | Dubovik et al. | |
| 2012/0124128 A1 | 5/2012 | Vonog et al. | |
| 2012/0127183 A1 | 5/2012 | Vonog et al. | |
| 2012/0151541 A1 | 6/2012 | Vonog et al. | |
| 2012/0182384 A1 | 7/2012 | Anderson | |
| 2012/0192087 A1 | 7/2012 | Lemmey | |
| 2012/0198334 A1 | 8/2012 | Surin et al. | |
| 2012/0246227 A1 | 9/2012 | Vonog et al. | |
| 2012/0002001 A1 | 10/2012 | Prentice | |
| 2012/0249719 A1 | 10/2012 | Lemmey et al. | |
| 2012/0254649 A1 | 10/2012 | Vonog et al. | |
| 2012/0272162 A1 | 10/2012 | Surin et al. | |
| 2012/0280905 A1 | 11/2012 | Vonog et al. | |
| 2012/0293600 A1 | 11/2012 | Lemmey et al. | |
| 2012/0297320 A1 | 11/2012 | Lemmey et al. | |
| 2012/0326866 A1 | 12/2012 | Lemmey et al. | |
| 2012/0331089 A1 | 12/2012 | Vonog et al. | |
| 2012/0331387 A1 | 12/2012 | Lemmey et al. | |
| 2012/0331405 A1 | 12/2012 | Eidelson et al. | |
| 2013/0014027 A1 | 1/2013 | Lemmey | |
| 2013/0014028 A1 | 1/2013 | Lemmey et al. | |
| 2013/0018960 A1 | 1/2013 | Knysz et al. | |
| 2013/0019184 A1 | 1/2013 | Vonog et al. | |
| 2013/0021431 A1 | 1/2013 | Lemmey et al. | |
| 2013/0024785 A1 | 1/2013 | Van Wie | |
| 2013/0063542 A1 | 3/2013 | Bhat | |
| 2013/0073978 A1 | 3/2013 | Butler | |
| 2013/0088518 A1 | 4/2013 | Lemmey et al. | |
| 2013/0097512 A1 | 4/2013 | Hong et al. | |
| 2013/0102854 A1 | 4/2013 | Zheng et al. | |
| 2013/0109302 A1 | 5/2013 | Levien et al. | |
| 2013/0115582 A1 | 5/2013 | El Kaliouby et al. | |
| 2013/0121503 A1 | 5/2013 | Ankolekar et al. | |
| 2013/0123019 A1* | 5/2013 | Sullivan | A63F 13/12 463/42 |
| 2013/0135468 A1* | 5/2013 | Kim | G06K 9/00771 348/143 |
| 2013/0151333 A1 | 6/2013 | El Kaliouby et al. | |
| 2013/0156093 A1 | 6/2013 | Vonog et al. | |
| 2013/0169742 A1 | 7/2013 | Wu | |
| 2013/0173531 A1 | 7/2013 | Rinearson | |
| 2013/0191479 A1 | 7/2013 | Gottlieb | |
| 2013/0201279 A1 | 8/2013 | Civinlar et al. | |
| 2013/0216206 A1 | 8/2013 | Dubin | |
| 2013/0239063 A1 | 9/2013 | Ubillos et al. | |
| 2013/0254287 A1 | 9/2013 | Biswas | |
| 2013/0289983 A1 | 10/2013 | Park | |
| 2013/0321648 A1* | 12/2013 | Tamiya | H04N 5/23222 348/207.1 |
| 2013/0330062 A1 | 12/2013 | Meikle et al. | |
| 2014/0004496 A1* | 1/2014 | Reddy | G09B 7/02 434/322 |
| 2014/0019882 A1 | 1/2014 | Chew et al. | |
| 2014/0026157 A1* | 1/2014 | Wang | H04N 21/25875 725/12 |
| 2014/0033900 A1 | 2/2014 | Chapman et al. | |
| 2014/0040784 A1 | 2/2014 | Behforooz et al. | |
| 2014/0051047 A1 | 2/2014 | Bender et al. | |
| 2014/0058828 A1 | 2/2014 | El Kaliouby et al. | |
| 2014/0154659 A1 | 6/2014 | Otwell | |
| 2014/0184723 A1* | 7/2014 | Morrison | H04N 7/147 348/14.07 |
| 2014/0201207 A1 | 7/2014 | Sadowsky et al. | |
| 2014/0229866 A1 | 8/2014 | Gottlieb | |
| 2014/0229888 A1 | 8/2014 | Ko et al. | |
| 2014/0325428 A1 | 10/2014 | Lee et al. | |
| 2015/0046800 A1 | 2/2015 | Isidore et al. | |
| 2015/0052453 A1 | 2/2015 | Yu et al. | |
| 2015/0106750 A1 | 4/2015 | Konami | |

FOREIGN PATENT DOCUMENTS

| | | |
|---|---|---|
| EP | 0721726 | 12/2000 |
| EP | 2471221 | 7/2012 |
| EP | 2484091 | 8/2012 |
| EP | 2630630 | 8/2013 |
| EP | 2636194 | 9/2013 |
| GB | 2446529 | 8/2008 |
| WO | 2009077936 | 6/2009 |
| WO | 2011025989 | 3/2011 |
| WO | 2011041229 | 4/2011 |
| WO | 2012021173 | 2/2012 |
| WO | 2012021174 | 2/2012 |
| WO | 2012021901 | 2/2012 |
| WO | 2012054089 | 4/2012 |
| WO | 2012054895 | 4/2012 |
| WO | 2012060977 | 5/2012 |
| WO | 2012060978 | 5/2012 |
| WO | 2012103376 | 8/2012 |
| WO | 2012135384 | 10/2012 |
| WO | 2012151471 | 11/2012 |
| WO | 2012177641 | 12/2012 |
| WO | 2012177779 | 12/2012 |
| WO | 2013343207 | 3/2013 |
| WO | 2013149079 | 10/2013 |

OTHER PUBLICATIONS

U.S. Appl. No. 12/624,840, filed Nov. 24, 2009, U.S. Pat. No. 8,390,670, Mar. 5, 2013.
U.S. Appl. No. 12/624,848, filed Nov. 24, 2009, U.S. Pat. No. 8,902,272, Dec. 2, 2014.
U.S. Appl. No. 12/688,631, filed Jan. 15, 2010, U.S. Pat. No. 8,647,206, Feb. 11, 2014.
U.S. Appl. No. 12/725,332, filed Apr. 1, 2010, U.S. Pat. No. 9,344,745, May 17, 2016.
U.S. Appl. No. 13/784,327, filed Mar. 4, 2010, U.S. Pat. No. 8,917,310, Dec. 23, 2014.
U.S. Appl. No. 13/849,696, filed Mar. 25, 2013, U.S. Pat. No. 9,041,768, May 26, 2015.
U.S. Appl. No. 13/925,059, filed Jun. 24, 2013, U.S. Pat. No. 9,401,937, Jul. 26, 2016.
U.S. Appl. No. 14/051,133, filed Oct. 10, 2013.
U.S. Appl. No. 14/068,261, filed Oct. 31, 2013.
U.S. Appl. No. 14/252,883, filed Apr. 15, 2014.
U.S. Appl. No. 14/255,475, filed Apr. 17, 2014.
U.S. Appl. No. 14/272,590, filed May 8, 2014.
U.S. Appl. No. 14/278,238, filed May 15, 2014, U.S. Pat. No. 9,401,132, Jul. 26, 2016.
U.S. Appl. No. 14/691,781, filed Apr. 21, 2015, U.S. Pat. No. 9,357,169, May 31, 2016.
U.S. Appl. No. 14/539,012, filed Nov. 12, 2014, U.S. Pat. No. 9,215,412, Dec. 15, 2015.
U.S. Appl. No. 14/528,977, filed Oct. 30, 2014.
U.S. Appl. No. 14/810,307, filed Jul. 27, 2015.
U.S. Appl. No. 14/938,449, filed Nov. 11, 2015.
About TokBox, Inc., All about TokBox, http://www.tokbox.com/about, retrieved Feb. 4, 2011, p. 1.

(56) References Cited

OTHER PUBLICATIONS

CrunchBase Profile, CrunchBase readeo, http://www.crunchbase.com/company/readeo, retrieved Feb. 3, 2011, pp. 1-2.
CrunchBase Profile, CrunchBase Rounds, http://www.crunchbase.com/company/6rounds, retrieved Feb. 4, 2011, pp. 1-2.
CrunchBase Profile, CrunchBase TokBox, http://www.crunchbase.com/company/tokbox, retrieved Feb. 4, 2011, pp. 1-3.
Online Collaboration GoToMeeting, http://www.gotomeeting.com/fec/online_collaboration, retrieved Feb. 4, 2011, pp. 1-4.
Readeo Press Release, http://www.mmpublicity.com, Feb. 25, 2010, pp. 1-2.
Rounds.com, Make friends online and enjoy free webcame chats, http://www.rounds.com/about, retrieved Feb. 4, 2011, pp. 1-3.
2011 Blackboard Collaborate User's Guide.
2007 WebEx Meeting Center User's Guide.
MacDonald, Heidi—Shindig Offers Authors Interactive Video Conferencing—Blog posted Sep. 12, 2012—Publishers Weekly. Retrieved from [http://publishersweekly.com] on [Aug. 15, 2016]. 5 Pages.
Shindig, Various Informational Pages Published as of Jul. 21, 2012—Retrieved via Internet Archive from [http://shindigevents.com] on [Aug. 5, 2016].
Slideshare—Shindig Magazine Video Chat Events. Slide Presentation published Oct. 9, 2012. Retrieved from [http://slideshart.net] on [Aug. 11, 2016]. 11 Pages.
Miyoshi et al. "Input device using eye tracker in human-computer interactions," Robot and Human Interactive Communication, 2001 Proceedings, 10th IEEE International, pp. 580-585.
Robin Wauters, "6rounds Launches Video Communication Platform With Several Layers of Fun," TechCrunch, Jun. 30, 2009, pp. 1-2, http://techcrunch.com/2009/06/30/6rounds-launches-video-communication-plafform-with-several-layers-of-fun/, accessed on Feb. 10, 2010.
"6rounds has officially launched!" 6rounds.com Blog, Jul. 3, 2009, pp. 1-4, http://blog.6rounds.com/official-launch-video-chat-website/, accessed on Feb. 10, 2010.
"The Gix00 Team on TV!" 6rounds.com Blog, Sep. 22, 2008, pp. 1-4, http://blog.6rounds.com/gixoo-tv-coverage-startup-factory/, accessed on Feb. 10, 2010.
Ustream Profile, Ustream, http://www.ustream.tv/help, retrieved Jul. 11, 2014, pp. 1-3.
Cisco, "Audio Controls Guide and Release Notes for FR29," Cisco WebEx User Guide, pp. 1-11.

\* cited by examiner

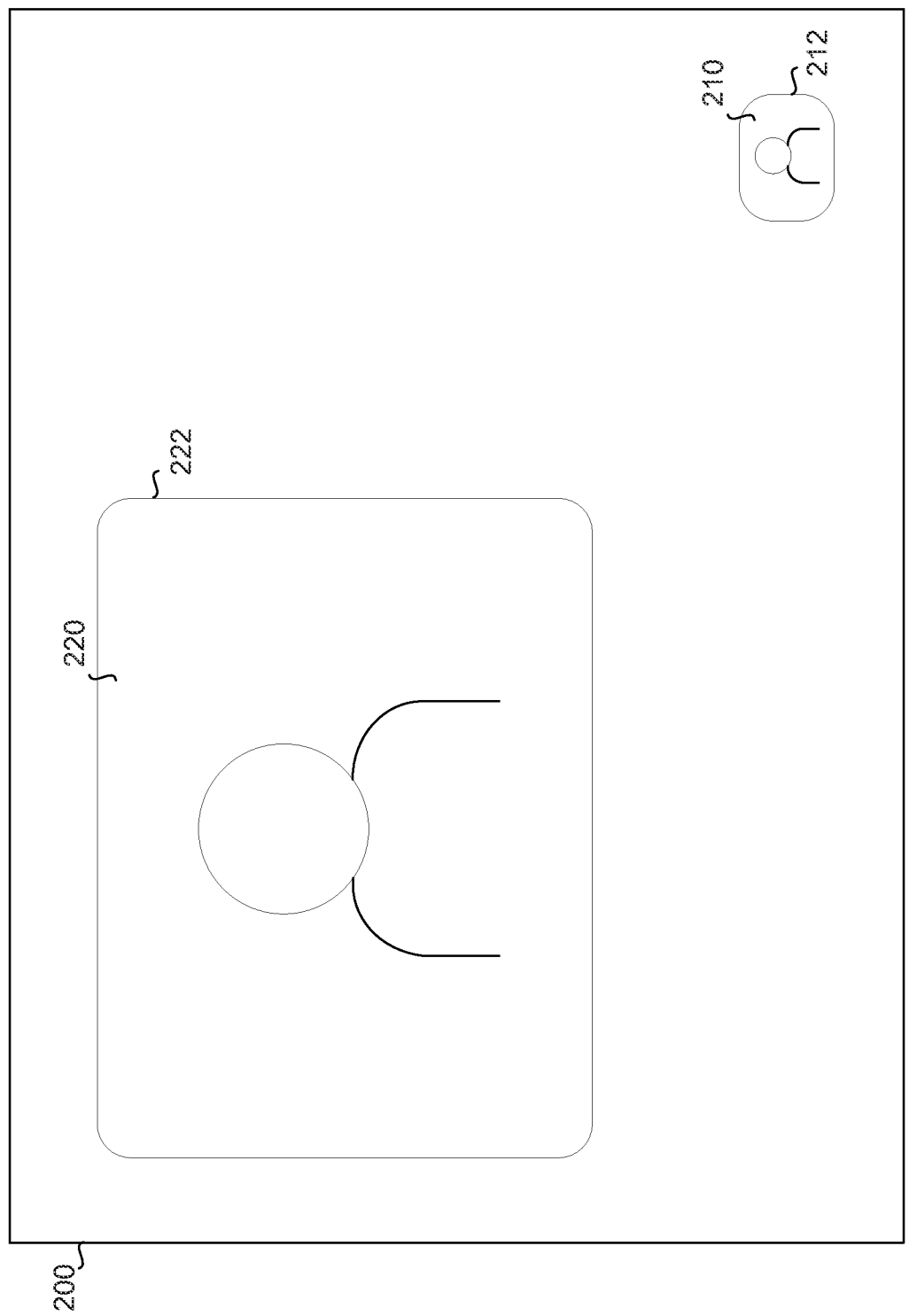

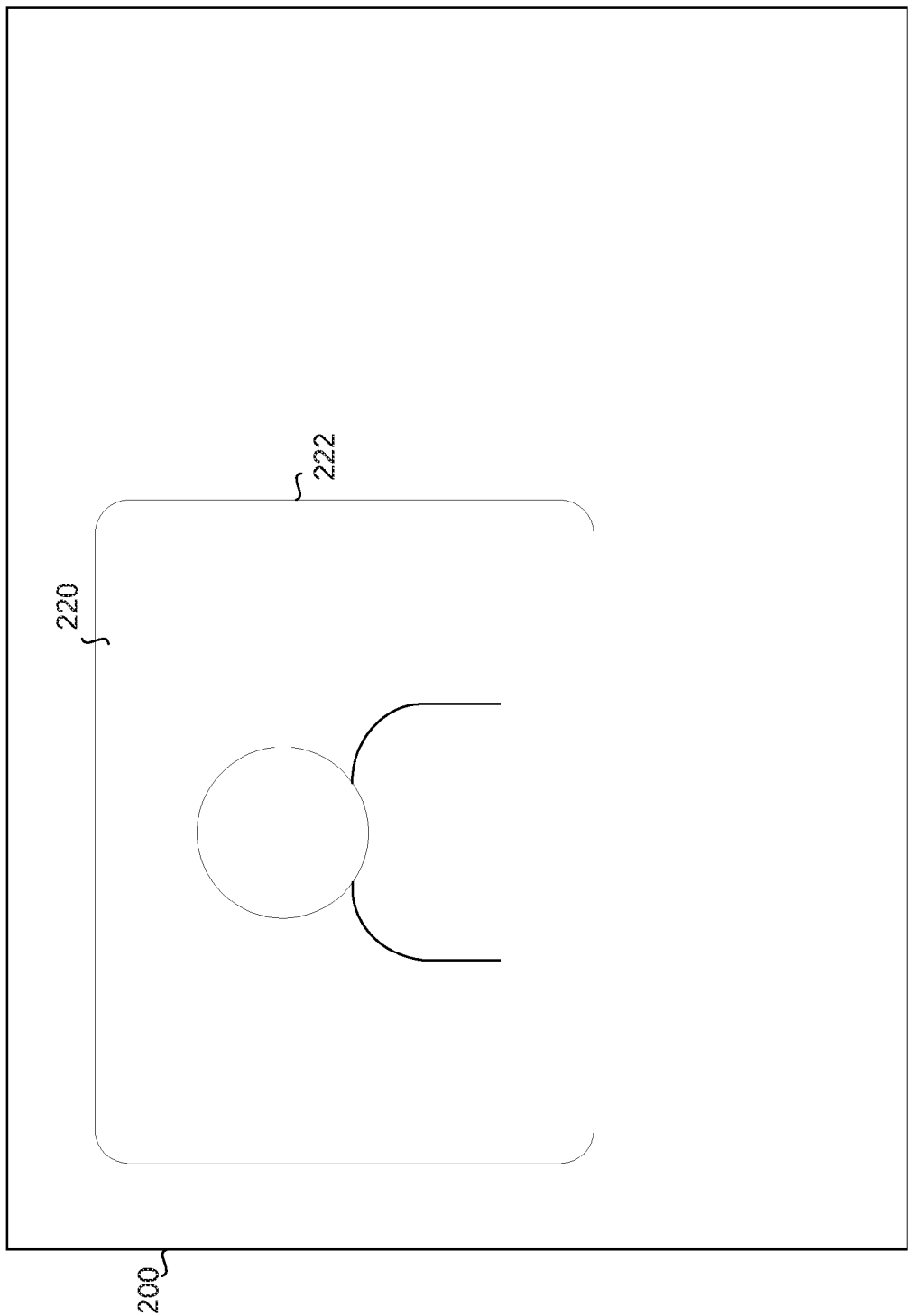

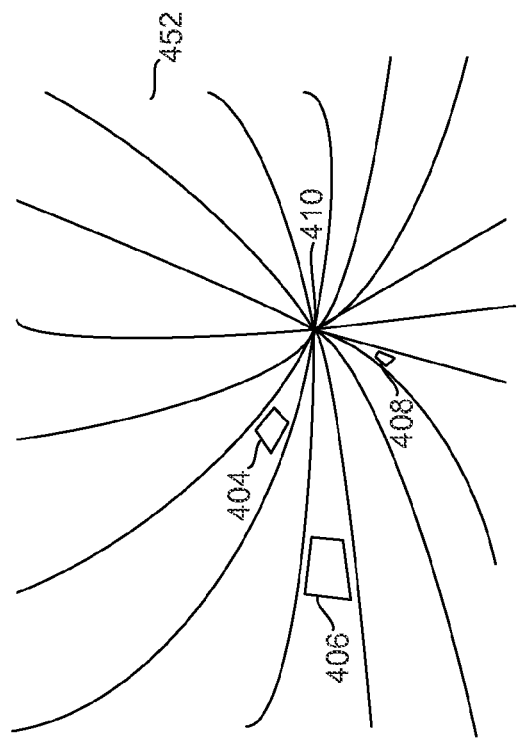
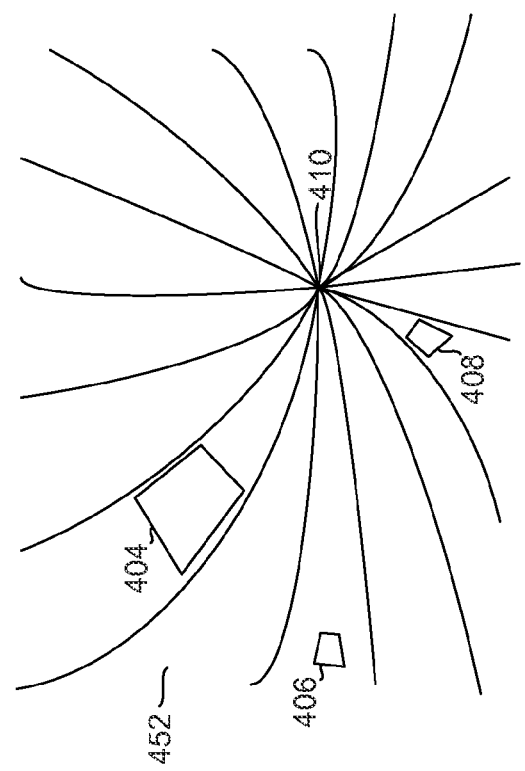

SYSTEMS AND METHODS FOR CONTROLLING THE DISPLAY OF CONTENT

BACKGROUND OF THE INVENTION

As technology continues to advance, computing devices are becoming equipped with better and more capabilities and features. Faster processors, larger memory, and improved network bandwidth have made various resource intensive functionalities possible, even on mobile devices, such as smartphones, tablet devices, and the like. Video chatting, for example, has evolved substantially and has become an increasingly popular pastime activity. Not only can users video chat on home or office computers now, but they can also do so using smaller mobile devices. Though convenient, however, mobile devices typically have smaller display screens, leaving little room to display video feeds. For example, in typical video conversations, live video feeds of a user of a device as well as those of one or more other users are displayed, but the user's own live feed can take up a significant amount of space or real estate on the display, and especially so on mobile devices. Because a user's main focus during a video chat are the live video feeds of other users, rather than his own, it can be advantageous to provide solutions for altering, or otherwise controlling the display of a user's own video feed.

Moreover, as users continue to demand more from their mobile devices, such as displaying or presenting a large number of images, text items, and/or other like objects, it can be difficult for users to maneuver the display and identify the various objects. Thus, it can be advantageous to provide solutions for altering, or otherwise controlling the display of objects on a display screen, such that a user can focus in on certain objects, while moving others out of focus or immediate view.

SUMMARY OF THE INVENTION

This relates to systems, methods, and devices for controlling the display of content.

In some embodiments, systems and methods for controlling the display of live video feeds are provided. This can include adjusting the display size of at least one of the live video feeds during a video chat. For example, a user can employ a device to conduct the chat with a remote user. The device can display the live video feed of the user himself as well as a live video feed of the remote user. Because the user may not necessarily desire to view his own feed during the chat, the display of his own feed can be altered when a predefined time elapses after the chat initiates. The alteration can, for example, include decreasing the display size of the user's own feed. As another example, the alteration can include completely removing the user's own feed from the display. In either example, the alteration can additionally include increasing the display size of the remote user's feed. Thus, more screen space can be made available for the video feeds of other users.

In some embodiments, systems and methods for controlling the display of objects are provided. This can include displaying objects in different regions of a display screen, and adjusting the display of the objects in the different regions in different manners. The regions can include a first region proximate the center of the screen, which can be designated as a foreground and/or focused region, and a second region surrounding the first region, which can be designated as a background and/or unfocused region. For example, a user can employ a device to conduct a group chat with a subset of users attending a multi-user online event. In this example, the members in the group chat can be represented by a first set of objects (e.g., live video feed windows or indicators) in a first region of the screen, and those who are in the event but who are not participating in the group chat, can be represented by a second set of objects (e.g., similar live feed windows or indicators) in a second region of the screen. As another example, the user can employ the device to view a plurality of images or text items, with some in the first region of the screen, and others in the second region of the screen. Because the number of displayed objects can be large, the display of the objects in the different regions can be altered in different manners in response to one or more user inputs (e.g., touch screen inputs, mouse click inputs, or the like). In at least one embodiment, the display size of objects in the first region can be increased, whereas the display size of objects in the second region can be substantially simultaneously decreased. Moreover, the objects in the first region can also be displaced toward the second region (e.g., moved away from the center of the screen), and the objects in the second region can be displaced toward the first region (e.g., moved toward the center of the screen). In at least one embodiment, the display quality of objects in the first region can be improved, whereas the display quality of the objects in the second region can be substantially simultaneously degraded. In any of these embodiments, the alteration of the display of the various objects can allow a user to focus on select objects, while moving others out of focus or immediate view.

In at least one embodiment, a method for controlling the display of video feeds during a video chat may be provided. The method may include displaying a video feed in a first manner, altering the display of the video feed when a predefined time elapses, and maintaining the altered display of the video feed until at least one predetermined event occurs.

In at least one embodiment, method for controlling the display of objects may be provided. The method may include displaying a plurality of objects on a display screen. A first set of the plurality of objects may be displayed in a first region of the display screen, and a second set of the plurality of objects may be displayed in a second region of the display screen. The method may also include receiving a user input to adjust display of at least one of the first set of objects and the second set of objects, and adjusting display of the first set of objects and the second set of objects in different manners based on the user input.

In at least one embodiment, a system for controlling the display of video feeds during a video chat may be provided. The system may include a display configured to display video feeds, and a controller configured to instruct the display to display at least one video feed, cause the display to alter the display of the at least one video feed when a predefined time elapses, and direct the display to maintain the altered display of the at least one video feed until at least one predetermined event occurs.

In at least one embodiment, a system for controlling the display of objects may be provided. The system may include a display screen configured to display objects, and a controller configured to cause the display screen to display a plurality of objects such that a first set of the plurality of objects is displayed in a first region of the display screen, and a second set of the plurality of objects is displayed in a second region of the display screen. The controller may also be configured to receive a user input to adjust display of at least one of the first set of objects and the second set of objects, and direct the display screen to adjust the display of the first set of objects and the second set of objects in different manners based on the user input.

In at least one embodiment, a computer readable medium may be provided. The computing readable medium may include computer readable instructions that, when executed by an electronic device, cause the electronic device to display a video feed in a first manner, alter the display of the video feed when a predefined time elapses, and maintain the altered display of the video feed until at least one predetermined event occurs.

In at least one embodiment, a computer readable medium may be provided. The computer readable medium may include computer readable instructions that, when executed by an electronic device, cause the electronic device to display a plurality of objects on a display screen. A first set of the plurality of objects may be displayed in a first region of the display screen, and a second set of the plurality of objects may be displayed in a second region of the display screen. The computer readable medium may also include computer readable instructions that, when executed by an electronic device, cause the electronic device to receive a user input to adjust display of at least one of the first set of objects and the second set of objects, and adjust display of the first set of objects and the second set of objects in different manners based on the user input.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 2B shows the display screen of FIG. 2A displaying the live video feeds in a second manner, in accordance with at least one embodiment;

FIG. 2C shows the display screen of FIGS. 2A and 2B displaying only one of the live video feeds, in accordance with at least one embodiment;

FIG. 4B shows a view of a graphical representation when a zoom in operation on the representation of FIG. 4A is initiated;

FIG. 4C shows a view of the graphical representation of FIG. 4B after the zoom in operation progresses further;

DETAILED DESCRIPTION

Figure 1:
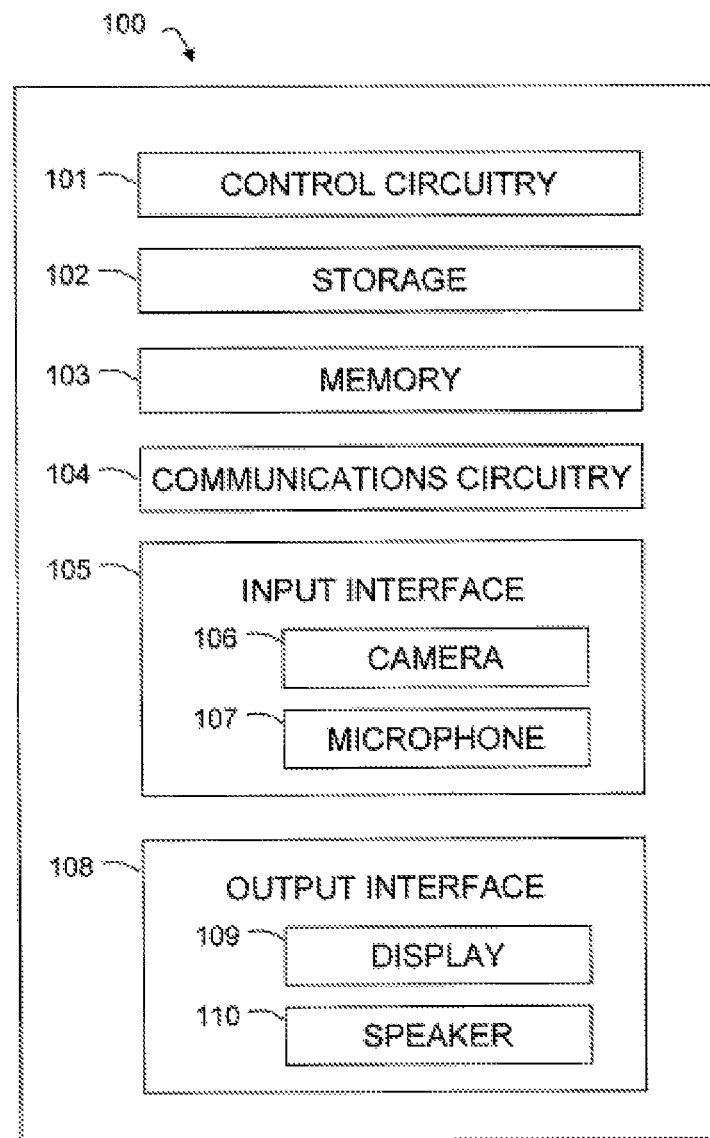
FIG. 1 is a block diagram of an illustrative user device, in accordance with at least one embodiment.

In accordance with at least one embodiment, users can interact with one another via user devices. For example, each user can interact with other users via a respective user device. FIG. 1 is a schematic view of an illustrative user device. User device 100 can include a control circuitry 101, a storage 102, a memory 103, a communications circuitry 104, an input interface 105, and an output interface 108. In at least one embodiment, one or more of the components of user device 100 can be combined or omitted. For example, storage 102 and memory 103 can be combined into a single mechanism for storing data. In at least another embodiment, user device 100 can include other components not shown in FIG. 1, such as a power supply (e.g., a battery or kinetics) or a bus. In yet at least another embodiment, user device 100 can include several instances of one or more components shown in FIG. 1.

User device 100 can include any suitable type of electronic device operative to communicate with other devices. For example, user device 100 can include a personal computer (e.g., a desktop personal computer or a laptop personal computer), a portable communications device (e.g., a cellular telephone, a personal e-mail or messaging device, a pocket-sized personal computer, a personal digital assistant (PDA)), or any other suitable device capable of communicating with other devices.

Control circuitry 101 can include any processing circuitry or processor operative to control the operations and performance of user device 100. Storage 102 and memory 103 can be combined, and can include one or more storage mediums or memory components.

Communications circuitry 104 can include any suitable communications circuitry capable of connecting to a communications network, and transmitting and receiving communications (e.g., voice or data) to and from other devices within the communications network. Communications circuitry 104 can be configured to interface with the communications network using any suitable communications protocol. For example, communications circuitry 104 can employ Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. In at least one embodiment, communications circuitry 104 can be configured to provide wired communications paths for user device 100.

Input interface 105 can include any suitable mechanism or component capable of receiving inputs from a user. In at least one embodiment, input interface 105 can include a camera 106 and a microphone 107. Input interface 105 can also include a controller, a joystick, a keyboard, a mouse, any other suitable mechanism for receiving user inputs, or any combination thereof. Input interface 105 can also include circuitry configured to at least one of convert, encode, and decode analog signals and other signals into digital data. One or more mechanisms or components in in input interface 105 can also be electrically coupled with control circuitry 101, storage 102, memory 103, communications circuitry 104, any other suitable components within device 100, or any combination thereof.

Camera 106 can include any suitable component capable of detecting images. For example, camera 106 can detect single pictures or video frames. Camera 106 can include any suitable type of sensor capable of detecting images. In at least one embodiment, camera 106 can include a lens, one or more sensors that generate electrical signals, and circuitry that processes the generated electrical signals. These sensors can, for example, be provided on a charge-coupled device (CCD) integrated circuit. Camera 106 can be electrically coupled with control circuitry 101, storage 102, memory 103, communications circuitry 104, any other suitable components within device 100, or any combination thereof.

Microphone 107 can include any suitable component capable of detecting audio signals. For example, microphone 107 can include any suitable type of sensor capable of detecting audio signals. In at least one embodiment, microphone 107 can include one or more sensors that generate electrical signals, and circuitry that processes the generated electrical signals. Microphone 107 can also be electrically coupled with control circuitry 101, storage 102, memory 103, communications circuitry 104, any other suitable components within device 100, or any combination thereof.

Output interface 108 can include any suitable mechanism or component capable of providing outputs to a user. In at least one embodiment, output interface 108 can include a display 109 and a speaker 110. Output interface 108 can also include circuitry configured to at least one of convert, encode, and decode digital data into analog signals and other signals. For example, output interface 108 can include circuitry configured to convert digital data into analog signals for use by an external display or speaker. Any mechanism or component in output interface 108 can be electrically coupled with control circuitry 101, storage 102, memory 103, communications circuitry 104, any other suitable components within device 100, or any combination thereof.

Display 109 can include any suitable mechanism capable of displaying visual content (e.g., images or indicators that represent data). For example, display 109 can include a thin-film transistor liquid crystal display (LCD), an organic liquid crystal display (OLCD), a plasma display, a surface-conduction electron-emitter display (SED), organic light-emitting diode display (OLED), or any other suitable type of display. Display 109 can be electrically coupled with control circuitry 101, storage 102, memory 103, any other suitable components within device 100, or any combination thereof. Display 109 can display images stored in device 100 (e.g., stored in storage 102 or memory 103), images captured by device 100 (e.g., captured by camera 106), or images received by device 100 (e.g., images received using communications circuitry 104). In at least one embodiment, display 109 can display communication images received by communications circuitry 104 from other devices (e.g., other devices similar to device 100). Display 109 can be electrically coupled with control circuitry 101, storage 102, memory 103, communications circuitry 104, any other suitable components within device 100, or any combination thereof.

Speaker 110 can include any suitable mechanism capable of providing audio content. For example, speaker 110 can include a speaker for broadcasting audio content to a general area (e.g., a room in which device 100 is located). As another example, speaker 110 can include headphones or earbuds capable of broadcasting audio content directly to a user in private. Speaker 110 can be electrically coupled with control circuitry 101, storage 102, memory 103, communications circuitry 104, any other suitable components within device 100, or any combination thereof.

In at least one embodiment, the user's own video image can be minimized. In these embodiments, a system can cause the image of a user's webcam to be displayed at one scale at the start of a chat or conversation, and can subsequently cause the image to automatically reduce to a different (e.g., smaller) scale, button, or even cause the image to be non-existent, after a period of time elapses.

The system can allow the image to be re-enlarged (e.g., to its original scale) or to reappear in response to a touch, click, or other user input or activation. The image can be re-enlarged or can reappear for a short duration that may be just enough to allow the user to confirm his or her view of self (e.g., to allow the user to confirm that the view being published is to the user's satisfaction), and then may be reduced or made to disappear again thereafter.

In at least one embodiment, the system can include one or more algorithms or logic that detects or assists in detecting substantial movement of the user, the appearance of a second head (e.g., of another person other than the user), disappearance of the head of the user (e.g., when he or she walks away from the device), significant changes in the overall brightness or darkness, or the like. In response to any of these, the system can similarly re-enlarge or redisplay the webcam image, and can subsequently reduce the image or remove the image from display after a predefined time elapses.

In some embodiments, the system can be turned off or deactivated for those users who always desires to see his or her own self-image during a conversation. In at least one embodiment, the system can also allow a user to provide an input (e.g., by holding down a particular button, by clicking, tapping, or otherwise selecting a reduced webcam image) to override the short term enlargement or reappearance of the image. In some embodiments, this action can additionally cause the conversation to end.

Figure 2A:
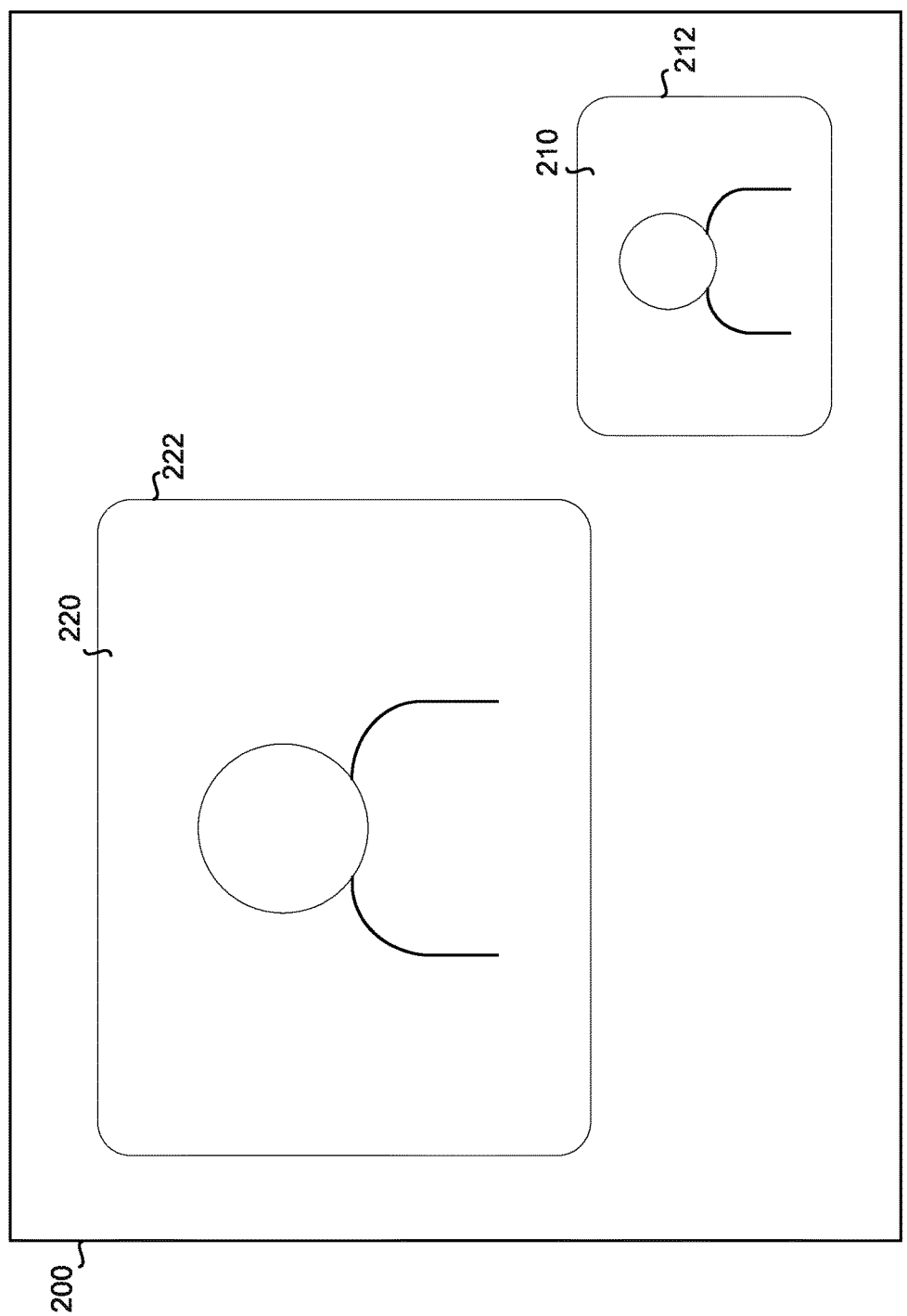
FIG. 2A shows an illustrative display screen displaying live video feeds in a first manner, in accordance with at least one embodiment.

FIG. 2A shows an illustrative display screen 200 of a device (e.g., display 109 of device 100) displaying live video feeds 210 and 220 in a first manner. Video feed 210 can correspond to a user of the device, and can be captured by a camera (e.g., camera 106) of the device, such as a webcam. Similarly, video feed 220 can correspond to a user of a remote device, and can be captured by a similar camera. The device can pass video data captured by the camera, as well as video data captured and transmitted by the remote device (e.g., over a communication channel) to screen 200 for display. In this way, screen 200 provides an interface that allows one to conduct live video conversations with others.

As shown in FIG. 2A, video feeds 210 and 220 can be displayed on screen 200 in respective windows 212 and 222. Moreover, video feeds 210 and 220 can each be initially displayed (e.g., at the start of a live conversation session) in a predefined size or scale. Although FIG. 2A shows screen 200 displaying video feed 210 in a smaller size than video feed 220, it should be appreciated that both video feeds 210 and 220 can be displayed in similar sizes at the start of the conversation.

Because the user of the device may not necessarily need to view a live feed of himself, it is advantageous to automatically alter the display of the user's own video feed during the video conversation. Thus, in at least one embodiment, a system can be provided to control how screen 200 displays video feeds 210 and 220. The system can be implemented as software, hardware, or any combination thereof. For example, the system can be implemented as software, can be executed by a processor of the device (e.g., control circuitry 101 of device 100), and, in at least one embodiment, can cause screen 200 to alter the display size of one or more of video feeds 210 and 220.

FIG. 2B shows display screen 200 displaying live video feeds 210 and 220 in a second manner. As shown in FIG. 2B, video feed 210 is displayed in a smaller size (e.g., similar to a small chat button or a chat bubble) than that shown in FIG. 2A. This change in display size of video feed 210 can be effected in response to control by the system. The reduction in size of video feed 210 can free up space or real estate in screen 200, and can also allow the user of the device, who may not necessarily need to view his own video feed at all times, to focus on video feed 220 of the other user.

The system can be configured to automatically alter the display in any suitable manner. For example, the system can be configured to cause video feed 210 to be scaled, or otherwise displayed on screen 200 in a smaller size, after a predetermined time elapses from the initiation of the conversation. The predetermined time can be any suitable value (e.g., 10 seconds, 15 seconds, 1 minute, etc.), and can be set by the user or can be preset and stored in the device by the provider of the device or the system. In embodiments that allow the user to set the predetermined time, the system can include a user interface (e.g., a settings or administrative window) that can be displayed on screen 200, and that can allow the user to modify various system settings.

Although FIG. 2B shows video feed 220 being displayed in the same size as in FIG. 2A, it should be appreciated that the system can also cause video feed 220 to be displayed in a different size (e.g., displayed larger than that shown in FIG. 2A such that the user of the device can more clearly see the live video of the other user during the chat).

Additionally, or alternatively, the system can cause video feed 210 to be entirely removed from screen 200 (e.g., by making it become invisible or non-existent). In this way, the user can focus entirely on the video feed 220 without being distracted by his own video. FIG. 2C shows display screen 200 displaying only live video feed 220. As shown in FIG. 2C, video feed 210 is no longer displayed in screen 200. This removal of video feed 210 can be effected in response to control by the system. The removal of video feed 210 can free up more space or real estate in screen 200, and can also allow the user of the device to focus entirely on video feed 220 of the other user.

Although FIG. 2C shows video feed 220 being displayed in the same size as in FIG. 2A, it should be appreciated that the system can also cause video feed 220 to be displayed in a different size (e.g., displayed larger than that shown in FIG. 2A such that the user of the device can more clearly see the live video of the other user during the chat).

In at least one embodiment, the system can initially cause video feed 210 to be reduced in size (e.g., as shown in FIG. 2B) after a first predetermined time elapses, and can subsequently cause video feed 210 to be removed entirely from screen 200 after a second predetermined time elapses. In this way, the user is not immediately deprived of view of his own video, but is eased into the transition. It should be appreciated that, in one or more of the size reduction and the removal of video feed 210, the size of video feed 220 can be substantially simultaneously enlarged so as to expand into the freed space in screen 200.

Because the user may occasionally wish to review his live video during the conversation, the system can be configured to rescale or increase the display size of video feed 210 after it has been reduced in size or removed from screen 200.

In at least one embodiment, the system can monitor for one or more user inputs to determine whether to increase the display size of video feed 210 or cause video feed 210 to reappear on screen 200. A suitable user input can include a touch screen input, a mouse click input, a voice command, or the like. In response to receiving a suitable user input, the system can cause screen 200 to either increase the display size of video feed 210 (if it has only previously been decreased in size, but not entirely removed), such as to that shown in FIG. 2A, or re-display video feed 210 (if it has actually been removed) as shown in either one of FIGS. 2A and 2B. In embodiments where the size of video feed 220 has also been previously increased in size, the system can substantially simultaneously re-scale video feed 220 to its original smaller size in order to accommodate video feed 210.

Additionally, or alternatively, the system can monitor for changes in video feed 210, and can determine whether to re-enlarge or re-display video feed 210 based on these changes. More particularly, the system can include one or more image or video analysis algorithms configured to analyze the video captured by the camera of the device. As one example, the system can include one or more algorithms for detecting substantial movement in the captured video feed (e.g., substantial movement of the user, such as getting up). As another example, the system can include one or more algorithms for detecting the presence of additional users (e.g., presence of a head of a second person within the camera's field of view). As yet another example, the system can include one or more algorithms for detecting changes in the brightness or darkness of the captured feed. In response to detecting one or more suitable changes in the captured feed, the system can cause screen 200 to either increase the display size of video feed 210 (if it has only previously been decreased in size, but not entirely removed), such as to that shown in FIG. 2A, or re-display video feed 210 (if it has actually been removed) as shown in either one of FIGS. 2A and 2B.

In at least one embodiment, the system can cause video feed 210 to be re-enlarged or re-displayed for only a short predefined time or duration (e.g., 5 seconds, 10 seconds, etc.). This predefined time can again be set by the system or the user (e.g., via a user interface), and can be sufficient to allow the user to review or confirm the live video of himself. After this predefined time elapses, the system can again cause video feed 210 to be one or more of reduced in size and removed from screen 200.

It should be appreciated that the feature of automatically altering the display of video feed 210 can be turned ON or OFF by the user (e.g., via a system user interface). For example, if the user desires to view his own video feed (e.g., as shown in FIG. 2A), the feature can be turned OFF.

In at least one embodiment, the system can also be configured to allow the user to end a conversation session by selecting video feed 210 or window 212. More particularly, the system can be configured to end the video conversation if a suitable user selection (e.g., via touch screen selection, mouse click selection, or the like) of window 212 (e.g., any of those shown in FIGS. 2A and 2B) is detected. A suitable user selection can include selection as well as holding down of window 212. For example, when the reduced-size video feed 210 (e.g., as shown in FIG. 2B) is selected by a touch screen input or a mouse click, and is held down or maintained, the system can override the functionality for re-enlarging video feed 210, and can instead, end the conversation session.

As briefly indicated above, it can be advantageous to provide systems and methods for controlling the display of objects on a display screen such that a user can focus on select objects, while moving others out of focus or immediate view.

In at least one embodiment, a system can divide a screen (e.g., virtually) into focused and unfocused regions (e.g., foreground and background regions). Objects displayed in the unfocused background may not necessarily be unfocused (e.g., unclear), but may be masked or otherwise diminished in visual presence, and may be presented with slightly lesser priority than objects displayed in the focused regions.

As one example, a user may be in a large scale online event with multiple users, and may be participating in a group video chat conversation with a select number of the users. The system can display the indicators (e.g., live video feeds) of users in the group differently than the indicators of users not in the group. In particular, the system can display the indicators of those in the group chat as combined or positioned close to one another within a focused region set near the center of the display. In contrast, the system can display the indicators of those users not in the group as smaller (e.g., thumbprint) video images in the unfocused background arrayed around or surrounding the group chat indicators.

To allow users to manipulate the sizes of the various indicators (or more generally, objects) and to move them between the focused and unfocused regions, the system can be configured to receive inputs. For example, the system can be configured to detect universal pinching commands, where two or more fingers of a user slide on a touchscreen to effect zooming in or out of displayed information, selections of an image scaling slider tool, or the like. In response to detecting a zoom out operation (e.g., a pinch operation on a touchscreen of the device) at or near the center of the display, the system can correspondingly reduce the size of the various objects displayed in the focused region. In at least one embodiment, these various objects can be reduced in size until they are no longer displayed (e.g., reduced sufficiently that they vanish in a "vanishing point" at or near the center of the display). Meanwhile, or substantially simultaneously to the reduction and vanishing of the focused objects, the surrounding objects in the unfocused region can be increased in size and/or visual quality, and can appear to fill in the space of the focused region by moving in toward the center of the display. This can give the effect of increasing priority to these objects, and decreasing priority to the formerly focused objects (e.g., similar to how a kaleidoscope works).

It should be appreciated that the objects can include any type of displayable element. That is, the system can be configured to control the display and transition of any type of displayable data between focused and unfocused regions. For example, the system can display a list of search results (e.g., text-based, image-based, or the like) on a mobile device screen such that a first search result appears (e.g., as a rectangle) filling a portion or the entirety of the visual area of the display as a focused object) and remaining results are presented in an unfocused region. As the screen is "pinched" to effect a zoom in operation at or near the center of the display, the first search result can shrink, and can be rearranged within a shrinking object that might either stay in the center of the screen or move toward a peripheral portion of the screen (e.g., the top of the screen), while one or more of the remaining results or associated content come into view from the unfocused region to the focused region.

The manipulation of the objects can be characterized as "oppositional" zoom. That is, while an object or objects are displayed at or near the center of a display (e.g., in the focused region) may be enlarged in response to a zoom in operation (e.g., a pinch out operation on a touch screen), a surrounding object or objects (e.g., in the unfocused region) may be reduced in size, such that some or all of the space that was previously occupied by the center objects is allocated to the surrounding objects.

It can be helpful to visualize this oppositional zoom effect by imagining a map (e.g., a geographical map) that can have some portions enlarged and other portions diminished depending on whether a zoom in or a zoom out operation is performed and the location of the zoom operation. For example, a zoom out operation at a center of the map will cause that center area to decrease in size, while simultaneously or substantially simultaneously enlarge the surrounding areas, in opposition.

It can further be helpful to visualize oppositional zoom by imagining a flat map that is operable to be manipulated over an imaginary spherical model having an imaginary hole on and through its surface. In response to a zoom in operation of a portion of the flat map at the vanishing hole, that portion of the map can enlarge or increasingly stretch over the surface of the spherical model, such that the map appears to transition between three-dimensional ("3D") and two-dimensional ("2D"), providing an appearance of foreshortening and reduced distance view. Conversely, in response to a zoom out operation of an area of the map at the imaginary hole, that area of the map may reduce in size toward a vanishing point, while simultaneously drawing or otherwise stretching surrounding areas of the map over the spherical model surface, as if the map is being pulled or sucked into the hole. It should be appreciated, that either of these zoom operations or actions can be performed dynamically, and when released, the map can retract or otherwise "relax" back to its normal flat state.

As described above, the system may provide oppositional zoom operations that can be effected using pinch operations (e.g., pinch operations on a touch screen display), where content (e.g., objects or other suitable data) can be pinched such that it is enlarged or shrunken (or collapsed) depending on the direction of the pinch (e.g., pinch-in or pinch-out), and content beyond the edges of the display (e.g., content that is virtually stored or lying beyond the display area, and that would otherwise be displayed if the display were larger) can be simultaneously or substantially simultaneously pulled or drawn into the display screen area. The system may also provide a combination of these oppositional zoom operations. In some embodiments, that content being pinched in may collapse or shrink, and the content nearest but external to the site of the pinch may be enlarged the most or more so than content farther away from the pinch site, such that there is a balance between the enlarging (or stretching) of that content nearest the pinch site and the pulling or bringing in and enlarging of new content lying beyond the edges of the display.

In some embodiments, e.g., when content is laid out or oriented in columns (e.g., as in a spreadsheet where there are rows and columns of data of objects), a zoom operation, such a pinching operation on a touch screen, may only cause the content to be displaced or pulled in a single dimension. For example, when a pinch-in operation is performed on a particular area or spot of a column of displayed data or objects, the objects above and below the pinched area or spot (e.g., at the upper and lower edges of the column) may be drawn or pulled in, while the content at or near the pinched area shrinks or collapses.

Figure 3A:
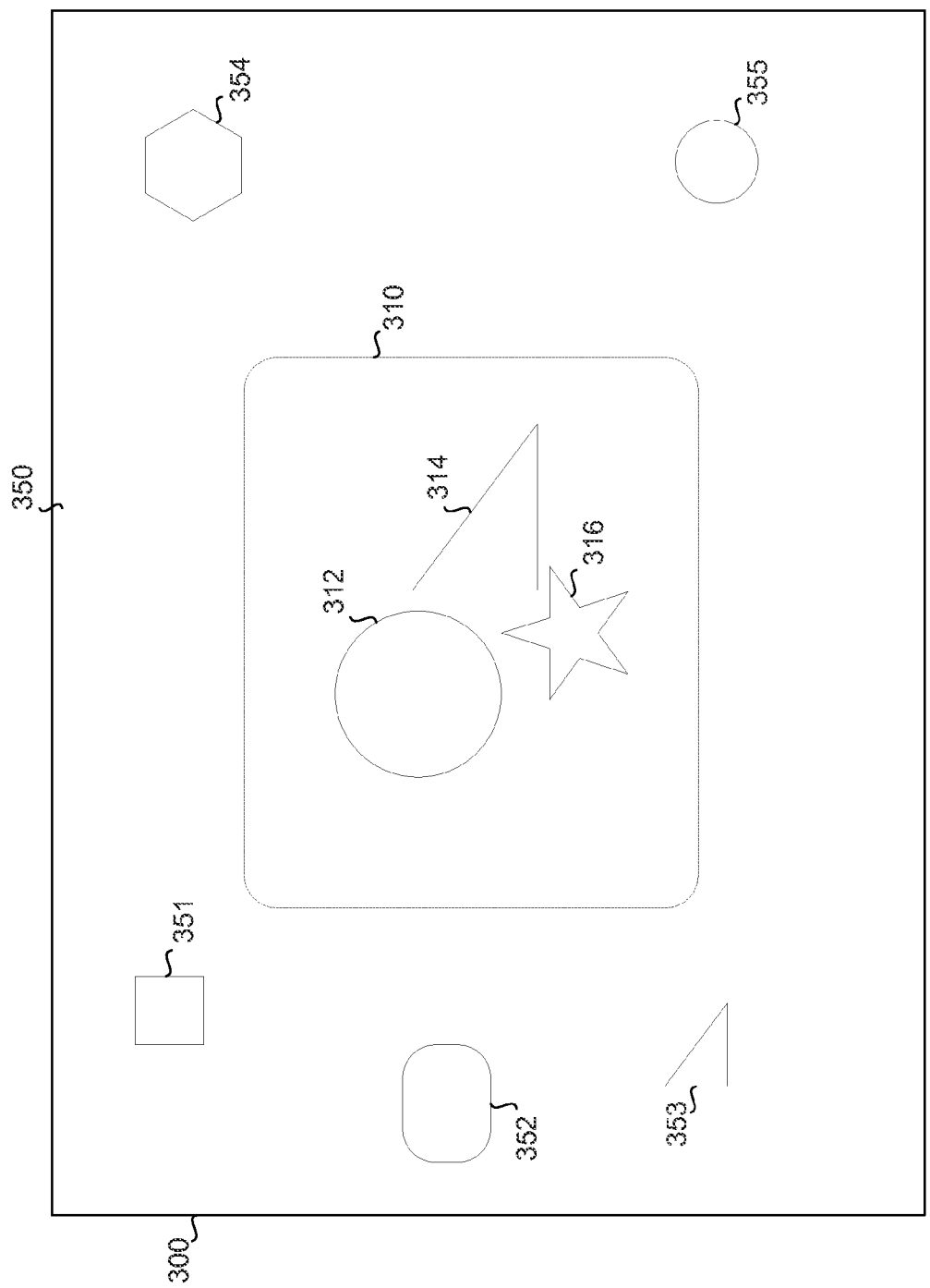
FIG. 3A shows another illustrative display screen displaying a plurality of objects in different regions of the screen, in accordance with at least one embodiment.

FIG. 3A shows an illustrative display screen 300 that can be similar to screen 200. As shown in FIG. 3A, screen 300 can be sectioned into different regions 310 and 350 and can display a plurality of objects. Region 310 can be proximate the center of screen 300, which can be a main point of user focus when viewing screen 300. In contrast, region 350 can surround region 310, and can extend from the bounds of region 310 to the periphery of screen 300. Accordingly, region 310 can be a designated foreground, and region 350 can be a designated background region. It should be appreciated that, although region 310 is shown as being rectangular, region 310 can assume any suitable shape and size.

As shown in FIG. 3A, screen 300 can display the objects throughout regions 310 and 350. More particularly, objects 312, 314, and 316 can be displayed in region 310, and objects 351-355 can be displayed in region 350. Moreover, objects 312, 314, and 316 can be displayed larger than objects 351-355, as shown in FIG. 3A.

The objects can include any of images, video feeds (or video feed indicators), text, and the like. As one example, a user can use the device to participate in a multi-user event with other users over a communication network. Each object in screen 300 can be an indicator (e.g., an image or a live webcam feed) that represents each user in the event. The event can allow the user to engage in conversation with some, but not all, of the users in the event. For example, the user can be in a group conversation with a subset of those in the event, the subset being represented by objects 312, 314, and 316. Whereas these objects can be bunched together in region 310 at or near the center of the screen, objects 351-355, which can represent other users not in the group chat, can be scattered about in region 350.

As another example, the user can use the device to view images (e.g., photos) or text data (e.g., search results). The main photo, photos, or text data (e.g., represented by objects 312, 314, and 316) can be displayed prominently and enlarged proximate the center of the screen in region 310, and the remaining images or text data (e.g., represented by objects 351-355) may be scattered about around the center of the screen.

In each of the examples above, the user may find it difficult to navigate the screen and or identify the various objects. For example, to conduct a video chat with users that are in the event but not currently in the group chat, the user may have to scroll the screen to find other users of interest. As another example, to view other images or text items not currently displayed in the display area, the user may have to scroll the screen. Moreover, because a large number of objects may need to be displayed at a time, the objects displayed in region 350 can be small and difficult to see or distinguish. Thus, a system can be provided to allow a user to control, or otherwise alter or adjust, the display sizes of the objects displayed in regions 310 and 350.

The system can allow altering of the display of the objects in screen 300 via one or more user inputs. In at least one embodiment, the system can allow a user to zoom in or out of region 310, which can alter the display sizes of objects 312, 314, and 316 as well as those of objects 351-355. Any suitable manner of adjusting the display sizes of the objects can be employed. For example, the universal pinching technique (e.g., where two or more fingers pressed against a touchscreen and move in various directions), a slide or zoom input, or the like can be employed for zooming in and out of the objects.

Figure 3B:
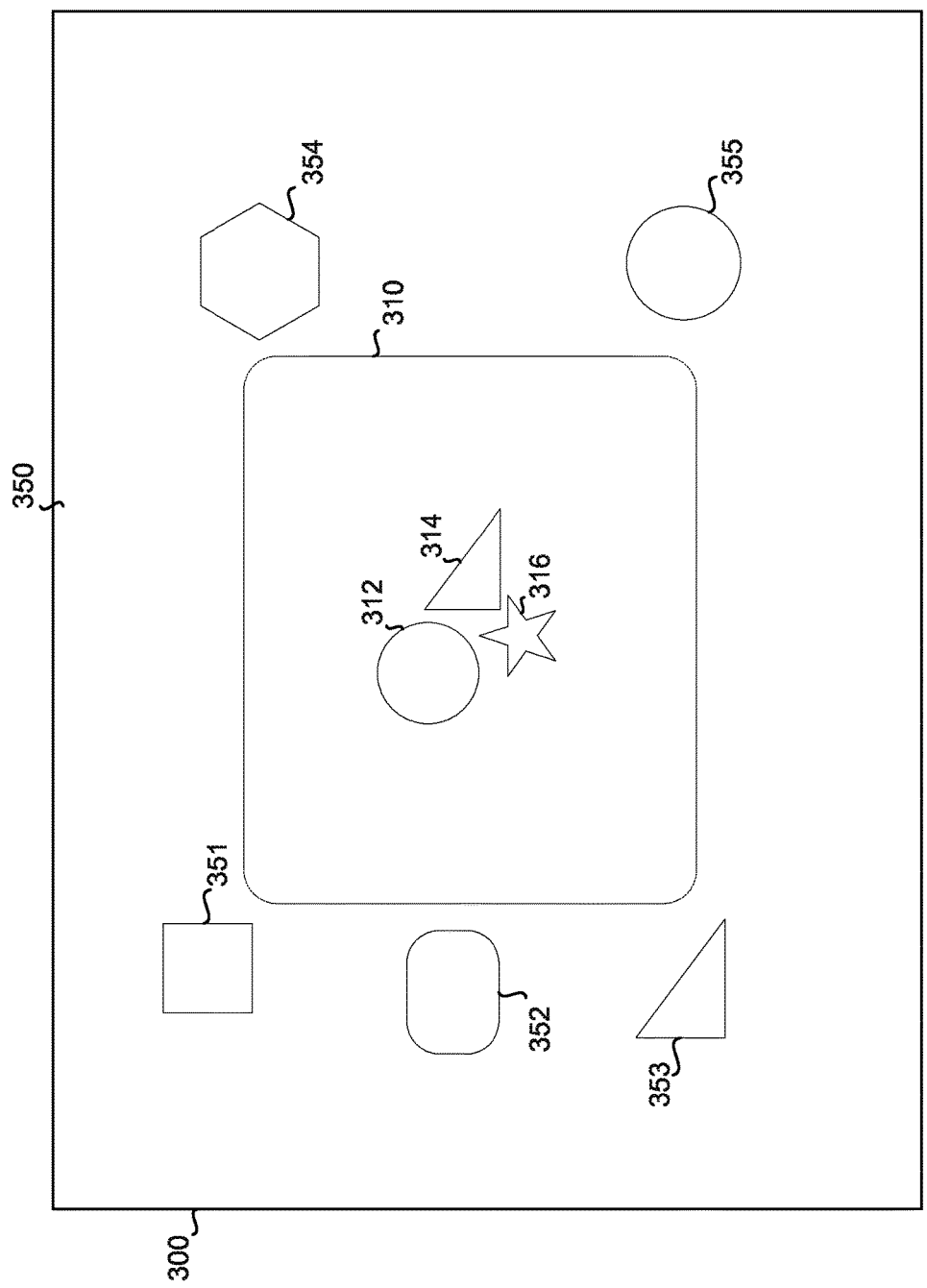
FIGS. 3B-3D show the screen of FIG. 3A displaying the objects in different sizes during a zoom out operation, in accordance with at least one embodiment.
Figure 3C:
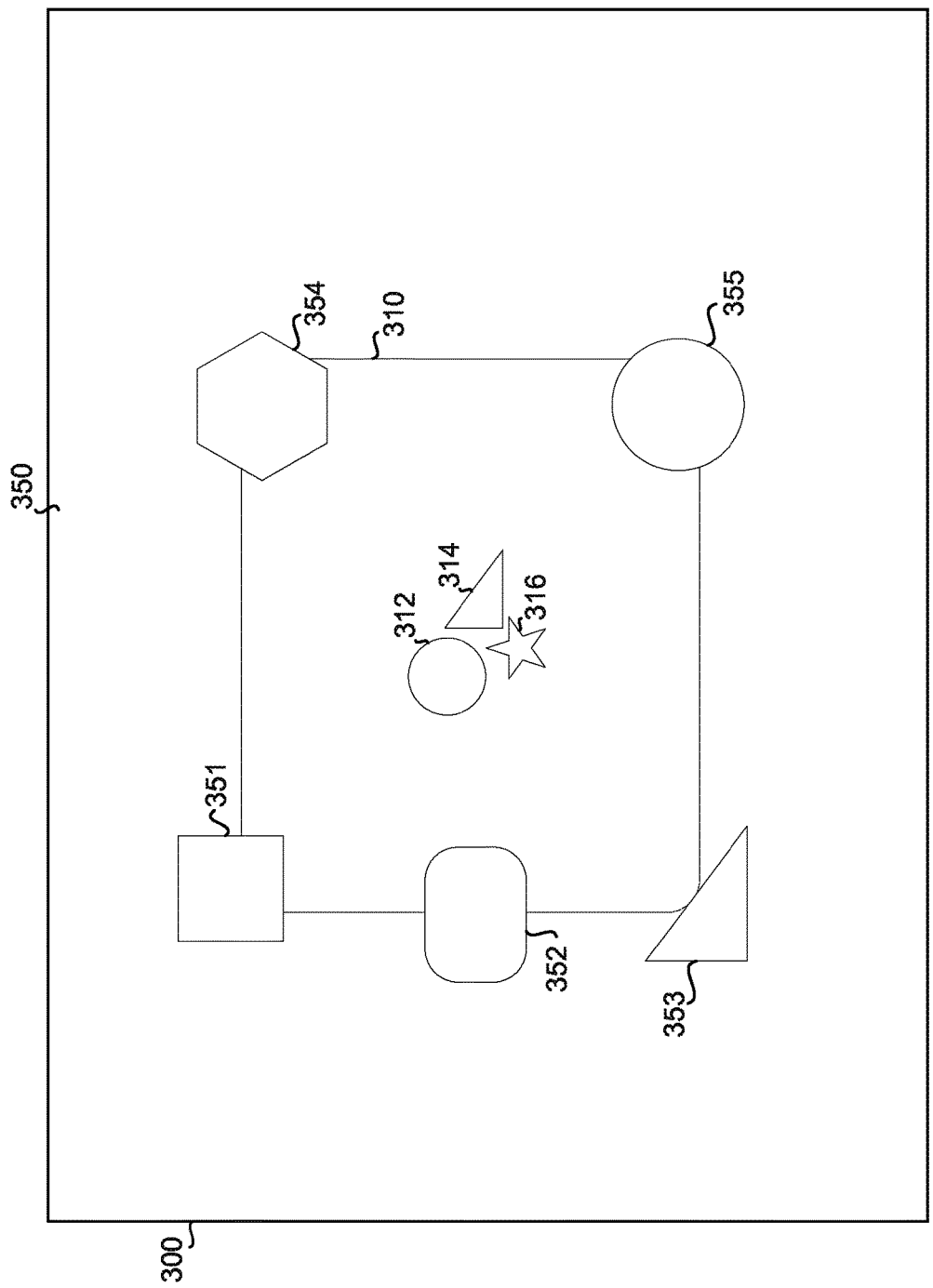
Figure 3D:
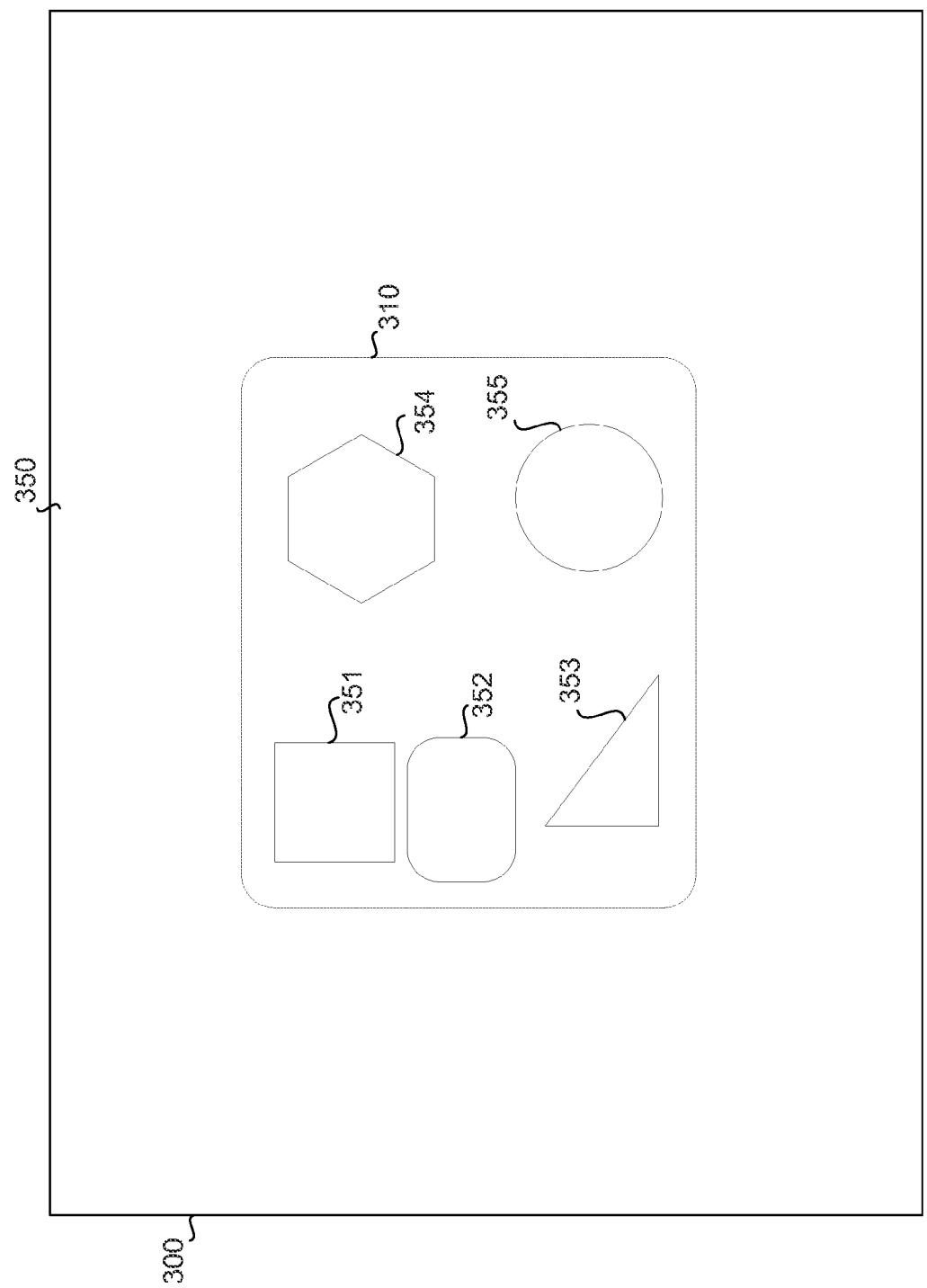

FIGS. 3B-3D show the changes in the display sizes of the objects in display screen 300 during a zoom out operation in any one of regions 310 and 350. As shown in FIG. 3B, for example, the objects in region 310 are smaller than that shown in FIG. 3A, and the objects in region 350 are larger than that shown in FIG. 3A. During the zoom out operation, the objects in region 350 can be enlarged substantially simultaneously with the reduced scaling of the objects in region 310. Moreover, the objects in region 350 can also be displaced closer toward the center of screen 300, as shown in FIGS. 3B and 3C.

Although not shown, it should be appreciated that the changes can be reversed during a zoom in operation. For example, objects 312, 314, and 316 can be enlarged during a zoom in operation, and objects 351-355 can be substantially simultaneously scaled down. Moreover, objects 351-355 can also be displaced farther away from the center of screen 300, or even vanish or disappear, so as to accommodate expanded objects 312, 314, and 316.

In at least one embodiment, during a zoom out operation, the size of the objects in region 310 can be decreased until they disappear or vanish from screen 300 altogether. FIG. 3D shows screen 300 with object 312, 314, and 316 removed. As shown in FIG. 3D, objects 351-355 of FIG. 3A can reside within region 310 in place objects 312, 314, and 316. For example, in the example described above where screen 300 is displayed on a device during a multi-user event, one or more user inputs can cause the system to remove objects 312, 314, and 316 from screen 300, which can trigger the group chat session to end.

Figure 3E:
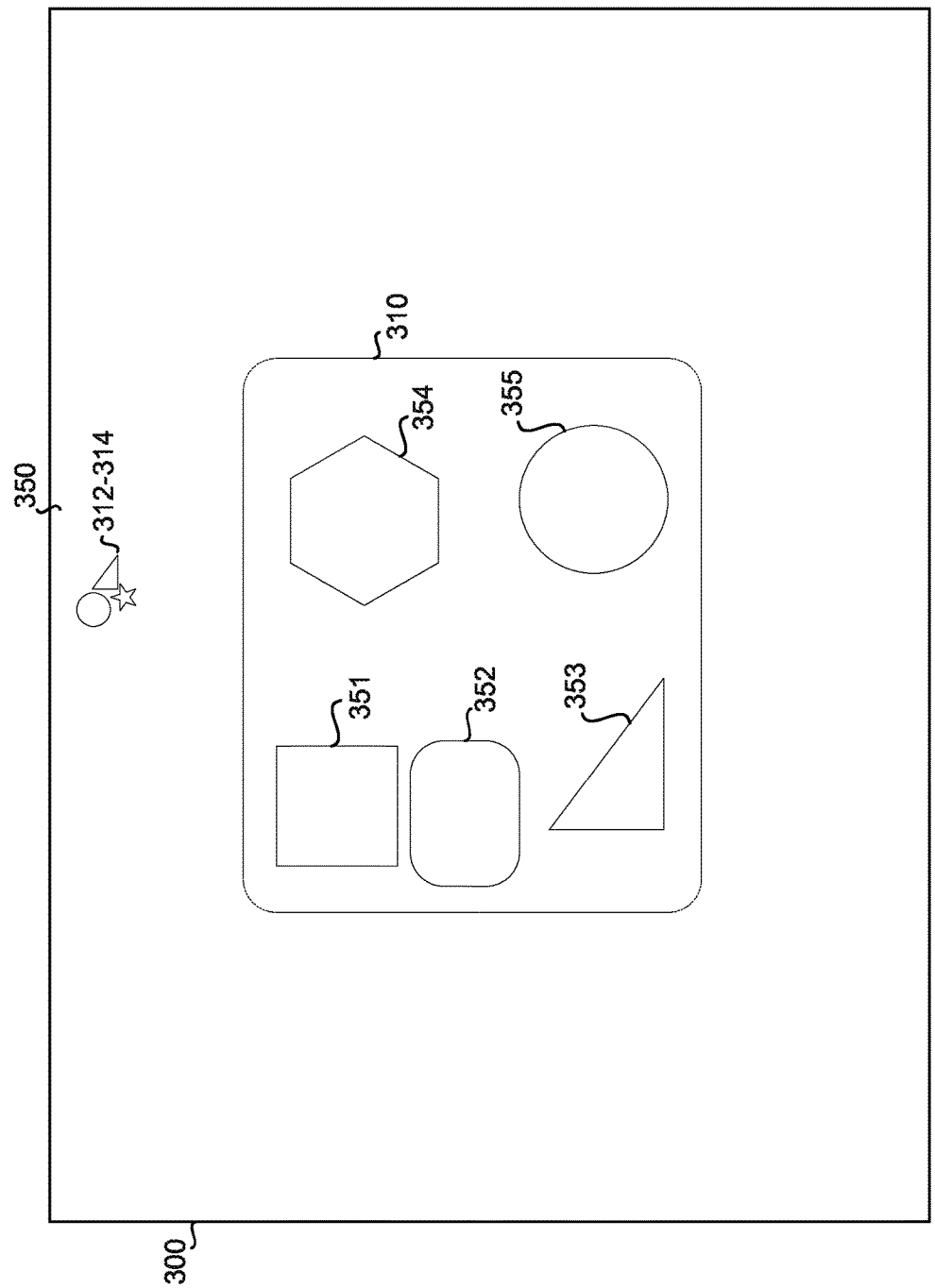
FIG. 3E shows the screen of FIG. 3A where the objects in one of the regions of the screen are moved to a peripheral portion of the screen, in accordance with at least one embodiment.

In at least one embodiment, rather than causing the objects in region 310 to disappear, the system can instead displace these objects to one or more other areas of screen 300. FIG. 3E shows objects 312, 314, and 316 having been moved to a peripheral portion of screen 300. These objects can, for example, be displaced to this portion of screen 300 in response to a zoom out operation in region 310. For example, in the example described above where images or text data are displayed on screen 300, the images or text data in region 310 can be moved toward or to the periphery of screen 300 when a full zoom out operation is performed on region 310. In this way, screen space or real estate can be made available for objects 351-355 to come toward and ultimately reside within region 310, as shown in FIG. 3E.

Moreover, although regions 310 and 350 have been described above as being foreground or background regions associated with objects being displayed in either larger or smaller sizes, it should be appreciated that regions 310 and 350 can be designated in other suitable manners. As another example, in at least one embodiment, region 310 can be a "focused" region, and region 350 can be an "unfocused" region. In these embodiments, objects 312, 314, and 316 can be displayed more clearly or in a different color or shade than objects 351-355. For example, in the example described above where screen 300 is displayed on a device during a multi-user event, the indicators in region 350 can be displayed in lighter color (e.g., faded, blurry, or the like), or can otherwise be displayed to have a low visual priority, whereas the indicators in region 310 can be displayed in full color, or can otherwise be displayed to have a high visual priority. Moreover, in some embodiments, region 310 can be both a foreground region as well as a focused region, with objects 312, 314, and 316 being displayed both larger and clearer than objects 351-355. For example, in the example described above where images or text data are displayed on screen 300, the indicators in region 350 can be displayed in lighter color and smaller, whereas the indicators in region 310 can be displayed in full color and larger.

Although screen 300 in FIG. 3A shows a plurality of objects in a plurality of regions 310 and 350, it should be appreciated that screen 300 can include only a single region and/or can display only a single object in any existing region. For example, in at least one embodiment, screen 300 can only include a single region (e.g., region 310) that spans the entire (or close to the entire) screen 300. This region can include one or more of objects 312, 314, and 316 that can, for example, one or more of shrink and disappear in response to a zoom out operation. Continuing the example, if and when the object or objects in this single region disappears, one or more other objects (e.g., objects 351-355) can subsequently appear in the screen and be positioned in region 310. In this way, the screen is not cluttered with a large number of objects, and the objects can be easily navigated by simply zooming in or out of the display. In these embodiments, rather than having a single zoom out operation cause one instance (or cycle) of objects 312, 314, and/or 316 to shrink and/or disappear, and objects 351-355 to enlarge, a single zoom out operation, such as a touch screen pinch zoom out operation, can instead cause a series of objects to appear, shrink, and disappear in such a way that many objects can be cycled through screen 300 for viewing within a single zoom out operation. For example, a single pinch zoom out operation can cause object 312 to decrease in size and disappear, object 314 to then appear, decrease in size and disappear, object 316 to then appear, decrease in size and disappear, and object 351 to then appear, decrease in size and disappear.

While the description of various embodiments are described with respect to particular objects, such as objects 312, 314, and 316, and 351-355, it should be appreciated that the advantageous effects of zooming in and out can be applied to any graphical representation that can be scaled. For example, the effects of zooming in and out can apply to a geographical map. In this example, a zoom in or enlargement operation (e.g., via the universal pinching method) of a particular portion or location on a displayed map image can enlarge that particular image portion, and substantially simultaneously scale down the image area surrounding the particular portion. The specific portion of the displayed image to be enlarged can be selected by a user (e.g., by using a boundary selection or drawing tool to identify the area to be enlarged), and any remaining image portions surrounding this selected area can be subjected to the scaling down. Similarly, a zoom out operation on the selected image portion can instead cause it to scale down, while image areas surrounding this image portion enlarge and progress to fill in the area of the smaller image portion.

Figure 4A:
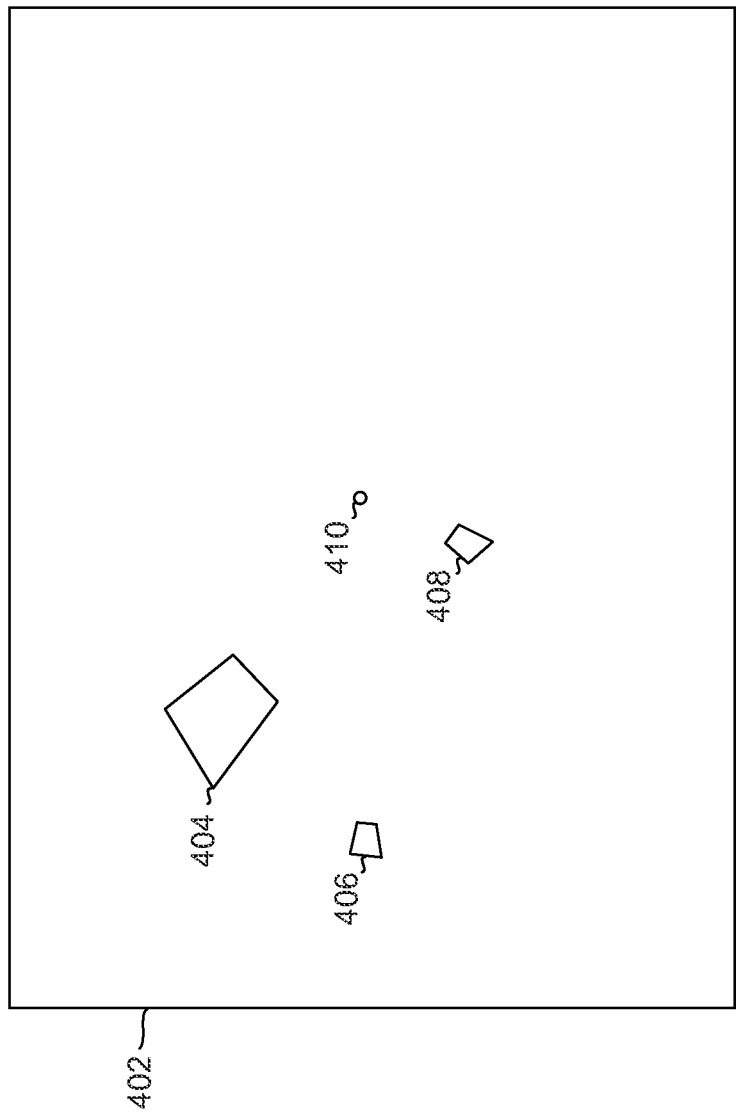
FIG. 4A shows a view of a graphical representation that can be displayed on a screen similar to the screen of FIGS. 3A-3E.

In various embodiments, the advantageous effects of zooming in and out of a screen or display described above can be applied in three-dimensional ("3D") graphical representations. For example, FIG. 4A shows a view of a graphical representation 402 that can be displayed on a screen similar to screen 300. Representation 402 can be a map (e.g., geographical, etc.) or the like, and can include various objects, including object 404, object 406, object 408, as well as a virtual center point 410 (e.g., that may not actually be displayed) at a center of the representation. Representation 402 can be displayed as a two-dimensional ("2D") map, and objects 404, 406, and 408 objects can be displayed as flat objects in 2D. However, while representation 402 may be a two-dimensional map, objects 404, 406, and 408 can have 3D characteristics (e.g., a substantially flat map can include various mountain lines or other topography).

While representation 402 can be subjected to a zoom in or out operation as described above, rather than scaling the representation and the objects in 2D (e.g., as described above with respect to screen 300, where objects are simply made smaller or larger), representation 402 can be manipulated, scaled, or otherwise adjusted in 3D during a zoom operation such that an actual 3D perspective view can be provided. For example, FIG. 4B shows a view of representation 452 when a zoom in operation on representation 402 is initiated. More particularly, representation 452 can be a portion of a spherical model (e.g., as depicted by the various curved lines that may not actually be displayed, but where such lines may help give a 3D perspective to a user viewing the screen) and can be a 3D rendition that corresponds to representation 402. Persons of ordinary skill in the art will appreciate the various techniques available to have 3D images, objects, models, graphics, or the like (e.g., modeled on a Cartesian or coordinate system) generated, created, or otherwise rendered based on 2D images, and how such 3D images can be manipulated in scale and position (e.g., via user selection of particular points of the displayed images or via other user input) to simulate what such adjustments would look like in real life. Thus, for the sake of brevity, a detailed discussion of the various techniques for effecting this will be omitted.

Returning to FIG. 4B, representation 452 can include objects 404, 406, and 408 rendered in 3D. Representation 452 can be displayed during a zoom in operation effected at an area proximate center point 410. For example, representation 452 can be displayed at the beginning of a zoom in operation (e.g., a two finger "pinch" on a touch screen displaying representation 452) that is performed at or near center point 410 of representation 402 of FIG. 4A. That is, a user may first view representation 402, and in response to a zoom in operation performed by the user on representation 402, the 3D rendition of representation 402 (i.e., representation 452) may then be presented.

As the zoom in operation continues to progress, the objects in representation 452 may be displayed differently. FIG. 4C shows a view of representation 452 after the zoom in operation progresses further (e.g., as a user continues to "pinch" the touch screen and moving his or her two fingers towards one another). As shown in FIG. 4C, objects 404, 406, and 408 have each changed in shape and size in accordance with the zoom in operation. For example, objects 404 and 406 can become smaller as they progress toward the center or vanishing point 410 As shown in FIG. 4C, objects 404 and 406 can even be foreshortened to reflect how a user may view the representation as the objects "travel" or "move" toward vanishing point 410. Similarly, object 406, which may have initially been smaller at a far end of representation 452 in FIG. 4B, can be moved closer toward point 410. As shown in FIG. 4C, object 406 can be enlarged as it travels or moves from the far end toward an area between the far end and point 410. Although not shown, it should be appreciated that object 406 may experience similar size and shape changes (e.g., decrease in size, foreshortening, or the like), as with objects 404 and 406 in FIG. 4C, if and when the zoom in operation continues to progress even further. Moreover, a further progression of the zoom in operation may cause objects 404 and 406 to begin to vanish towards vanishing point 410, and give a viewer an effect that the objects are being drawn into a virtual or imaginary hole of the map represented by vanishing point 410.

Thus, similar to how the objects in screen 300 can be manipulated in scale via zoom operations, objects in 3D can be similarly manipulated. It should be appreciated that representation 452 can also be subjected to a zoom out operation. For example, starting from FIG. 4C, if representation 452 is subjected to a zoom out operation (e.g., two fingers on a touchscreen and moving away from one another), objects 404, 406, and 408 may "move" in an opposite direction and eventually return to their respective positions, as shown FIG. 4B. In some embodiments, a total release of a zoom in operation (e.g., after zooming in a little but not entirely, and then releasing the zoom in operation (e.g., by removing one or more fingers from the touchscreen), can cause representation 452 to be displayed, and can even further cause representation 402 to replace representation 452. That is, if the zoom in operation is terminated, the display or screen can present a progression of objects 404, 406, 408 moving back to their original positions, so as to provide an effect of a 3D rendition (e.g., FIGS. 4B and 4C) returning to a 2D representation (e.g., FIG. 4A). If, the zoom in operation was actually sufficient enough to cause any of objects 404, 406, and 408 to move all the way to center point 410 and thus vanish into point 410, such object would be shown to progress back into view and back to their original positions.

It should be appreciated that FIGS. 4B and 4C may not be drawn to scale in 3D, but that a person of ordinary skill in the art will appreciate that effects of the zoom operations on the 3D renditions of objects 404, 406, and 408 described above.

Figure 5:
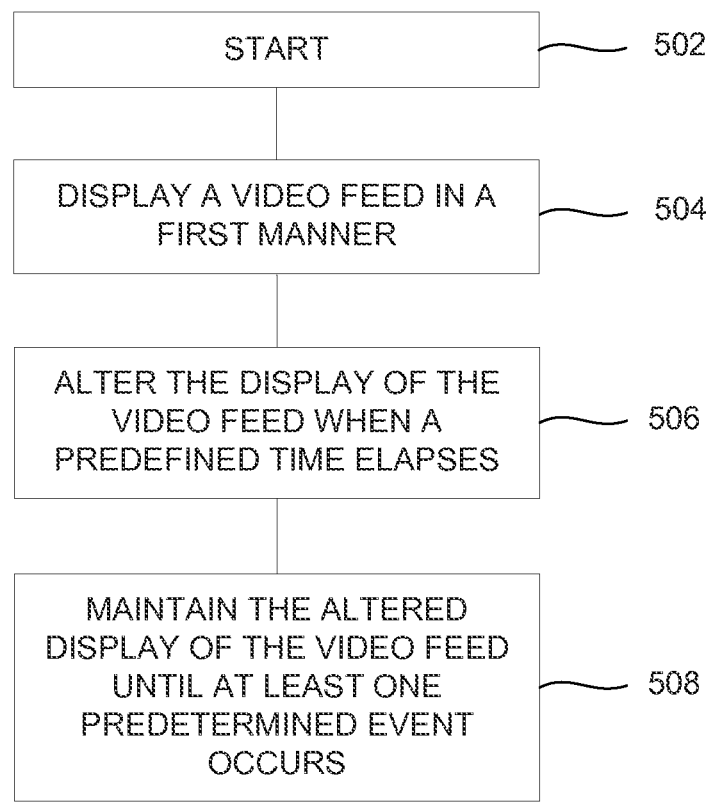
FIG. 5 shows an illustrative process for controlling the display of live video feeds, in accordance with at least one embodiment.

FIG. 5 is an illustrative process 500 for controlling the display of live video feeds in a video chat. Process 500 can, for example, be implemented as software, and can be executed by a device processor (e.g., control circuitry 101 of device 100). Process 500 can begin at step 502. At step 504, the process can include displaying the video feed in a first manner. For example, the process can include displaying video feed 210 on screen 300 in a first manner, as shown in FIG. 2A.

At step 506, the process can include altering the display of the video feed when a predefined time elapses. For example, the process can include altering the display of video feed 210 when a predefined time elapses, as described above with respect to FIG. 2A, and as shown in any one of FIGS. 2B and 2C. More particularly, in at least one embodiment, the process can include reducing the display size of the video feed as shown in FIG. 2B. Moreover, in at least another embodiment, the process can include removing the video feed altogether as shown in FIG. 2C.

At step 508, the process can include maintaining the altered display of the video feed until at least one predetermined event occurs. For example, the process can include maintaining the altered display of video feed 210 until at least one predetermined event occurs. In at least one embodiment, the predetermined event can include receiving a user input, such as a touch screen input, a mouse click, or the like, as described above with respect to FIGS. 2A-2C. In at least another embodiment, the predetermined event can include at least one change in an environment being captured in the video feed. For example, the predetermined event can include any one of a change in brightness of the environment, substantive movement of at least one user in the environment, and a change in a number of users in the environment.

In response to the occurrence of the at least one predetermined event, the process can also include re-displaying the video feed in the first manner. For example, if the video feed has been decreased in size, the process can include re-enlarging the display size of the video feed. As another example, if the video feed has been removed from the display screen, the process can include re-displaying the video feed in its original size. It should be appreciated that, after the video feed is re-displayed, the process can repeat the alteration of the display of the video feed when the predefined time elapses again after the re-display.

Figure 6:
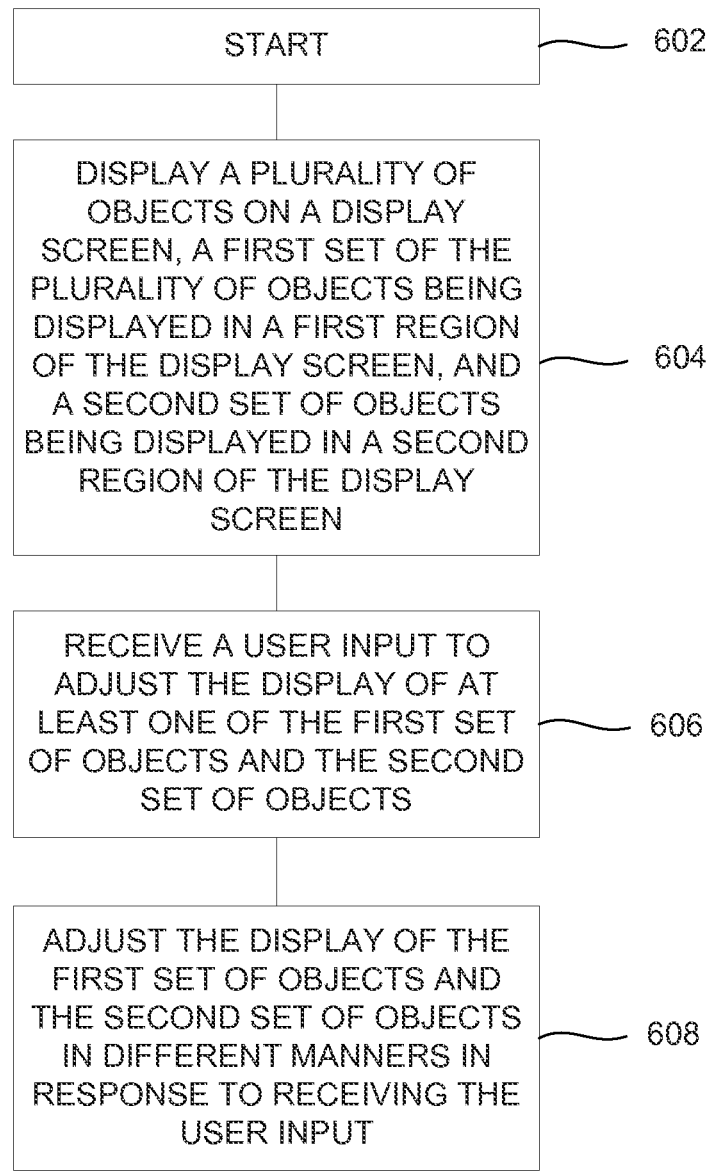
FIG. 6 shows an illustrative process for controlling the display of objects, in accordance with at least one embodiment.

FIG. 6 is an illustrative process 600 for controlling the display of objects. Process 600 can, for example, be implemented as software, and can be executed by a device processor (e.g., control circuitry 101 of device 100). Process 600 can begin at step 602. At step 604, the process can include displaying a plurality of objects on a display screen, where a first set of the plurality of objects is displayed in a first region of the display screen, and where a second set of the plurality of objects is displayed in a second region of the display screen. For example, the process can include displaying objects 312, 314, 316, and 351-355 on display screen 300, where a first set of the objects including objects 312, 314, and 316 is displayed in region 310 of the screen 300, and a second set of the objects including objects 351-355 are displayed in region 350 of the screen 300, as shown in and described above with respect to FIG. 3A.

At step 606, the process can include receiving a user input to adjust the display of at least one of the first set of objects and the second set of objects. For example, the process can include receiving a user input to adjust the display of at least one of the first set of objects (e.g., objects 312, 314, and 315) and the second set of objects (e.g., objects 351-355). The user input can include a pinch command on the display screen, movement of a display size slider button, a voice command, or the like.

At step 608, the process can include adjusting the display of the first set of objects and the second set of objects in different manners in response to receiving the user input. For example, the process can include adjusting the display of the first set of objects 312, 314, and 316 and the second set of objects 351-355 in different manners. As described above with respect to FIGS. 3A-3E, the display of the first and second sets of objects can be adjusted in any suitable manner. In at least one embodiment, the process can include adjusting the display by decreasing a display size of at least one object in the first set of objects, and increasing a display size of at least one object in the second set of objects. For example, the process can include adjusting the display by decreasing a display size of at least one of objects 312, 314, and 316, and increasing a display size of at least one of objects 351-355. In at least one embodiment, the process can additionally include displacing the at least one object in the first set of objects towards the second region, and displacing the at least one object in the second set of objects towards the first region. For example, the process can additionally include displacing the at least one of objects 312, 314, and 316 towards region 350, and displacing the at least one of objects 351-355 towards region 310. Moreover, in at least one embodiment, the process can include adjusting the display by increasing a display quality of the at least one object in the first set of objects, and decreasing a display quality of the at least one object in the second set of objects. For example, the process can include adjusting the display by increasing a display quality of the at least one of objects 312, 314, and 316, and decreasing a display quality of the at least one of objects 351-355.

It should be appreciated that the various embodiments described above can be implemented by software, but can also be implemented in hardware or a combination of hardware and software. The various systems described above can also be embodied as computer readable code on a computer readable medium. The computer readable medium can be any data storage device that can store data, and that can thereafter be read by a computer system. Examples of a computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The above described embodiments are presented for purposes of illustration only, and not of limitation.

What is claimed is:

1. A method for controlling the display of video feeds during a video chat, the method comprising:
    displaying a video feed in a first manner, wherein the video feed includes an individual captured by a camera;
    determining that a predefined time period has elapsed;
    displaying, in response to the predefined time period elapsing, the video feed in a second manner;
    detecting at least one predetermined event, wherein the at least one predetermined event comprises the camera capturing at least one additional individual not displayed within the video feed appearing in the environment and a substantive movement of the individual in the environment; and
    displaying automatically, in response to detecting the at least one predetermined event, the video feed in a third manner by automatically increasing the display size of the video feed in proportion to the amount of individuals in the environment each individual captured by the camera is displayed within the video feed.

2. The method of claim 1, wherein the video feed displayed in a second manner is displayed in at least one of: a different location than the first manner, a different size than the first manner, and a different shape than the first manner.

3. The method of claim 2, wherein displaying the video feed in the first manner comprises displaying the video feed at a first display size, and wherein displaying the video feed in the second manner comprises displaying the video feed at a second display size.

4. The method of claim 3, wherein the second display size is different than the first display size.

5. The method of claim 3, wherein the second display size is smaller than the first display size.

6. The method of claim 1, wherein displaying the video feed in a second manner comprises preventing the video feed from being displayed.

7. The method of claim 1, wherein the video feed comprises a webcam video feed.

8. The method of claim 1, wherein the at least one predetermined event further comprises receiving a user input.

9. The method of claim 1, further comprising re-displaying the feed in the first manner when the predetermined event is reversed.

10. A system for controlling the display of video feeds during a video chat, the system comprising:
    a camera;
    a display configured to display video feeds; and
    a controller configured to:
        instruct the display to display at least one video feed in a first manner, wherein the video feed includes an individual captured by the camera;
        determine that a predefined time period has elapsed;
        display, in response to the predefined time period elapsing, the video feed in a second manner;
        detect at least one predetermined event, wherein the at least one predetermined event comprises the camera capturing at least one additional individual not displayed within the video feed appearing in the environment and a substantive movement of the individual in the environment; and
        display automatically, in response to detecting at least one predetermined event, the video feed in a third manner by automatically increasing the display size of the video feed in proportion to the amount of individuals in the environment such that each individual captured by the camera is displayed within the video feed.

11. A computer readable medium comprising computer readable instructions that, when executed by an electronic device, cause the electronic device to:
    display a video feed in a first manner, wherein the video feed includes a user;
    determine that a predefined time period has elapsed;
    display, in response to the predefined time period elapsing, the video feed in a second manner;
    detect at least one predetermined event, wherein the at least one predetermined event comprises at least one additional user not displayed within the video feed appearing in the environment; and
    display, in response to detecting at least one predetermined event, the video feed in a third manner by automatically increasing the display size of the video feed such that the user and the at least one additional user are appropriately displayed within the video feed.

* * * * *